United States Patent
Tamura

(10) Patent No.: US 6,907,049 B1
(45) Date of Patent: Jun. 14, 2005

(54) RADIO COMMUNICATION APPARATUS USED IN CDMA COMMUNICATION SYSTEM, WHICH HAS FINGERS AND IS DESIGNED TO PERFORM RAKE RECEPTION, AND POWER CONSUMPTION CONTROL METHOD THEREFOR

(75) Inventor: Koichi Tamura, Tokyo (JP)

(73) Assignee: NEC Corporation, Tokyo (JP)

( * ) Notice: Subject to any disclaimer, the term of this patent is extended or adjusted under 35 U.S.C. 154(b) by 1035 days.

(21) Appl. No.: 09/610,041

(22) Filed: Jul. 5, 2000

(30) Foreign Application Priority Data

Jul. 6, 1999 (JP) .......................................... 11-191164

(51) Int. Cl.[7] .............................................. H04J 13/00
(52) U.S. Cl. ...................... 370/479; 370/335; 370/336; 370/345; 370/342; 370/320; 370/321; 375/148; 375/144
(58) Field of Search ................................ 370/479, 335, 370/342, 341, 320; 375/147, 144, 148, 349, 150

(56) References Cited

U.S. PATENT DOCUMENTS 6,229,842 B1 * 5/2001 Schulist et al. ............. 375/148
6,373,882 B1 * 4/2002 Atarius et al. .............. 375/148
6,510,143 B1 * 1/2003 Bejjani et al. .............. 370/320
6,650,692 B2 * 11/2003 Inoue et al. ................ 375/147

FOREIGN PATENT DOCUMENTS

| EP | 0 756 391 A1 | 1/1997 |
|----|---|---|
| EP | 0 924 868 A1 | 6/1999 |
| JP | 10-051356 | 2/1998 |
| JP | 10-065578 | 3/1998 |
| JP | 11-004213 | 1/1999 |
| JP | 11-2749982 | 10/1999 |
| JP | 2000-174729 | 6/2000 |
| JP | 2000-278176 | 10/2000 |

* cited by examiner

Primary Examiner—Wellington Chin
Assistant Examiner—Chuong Ho
(74) Attorney, Agent, or Firm—Scully, Scott, Murphy & Presser

(57) ABSTRACT

A radio communication apparatus which is used in a CDMA communication system, has a plurality of fingers, and performs rake reception, includes a delay profile calculating section and a finger path allocating section. The delay profile calculating section calculates a delay profile using a reception signal. The finger path allocating section allocates path positions to the plurality of fingers on the basis of the delay profile calculated by the delay profile calculating section. A delay profile calculation cycle in the delay profile calculating section is variable. A power consumption control method is also disclosed.

13 Claims, 25 Drawing Sheets

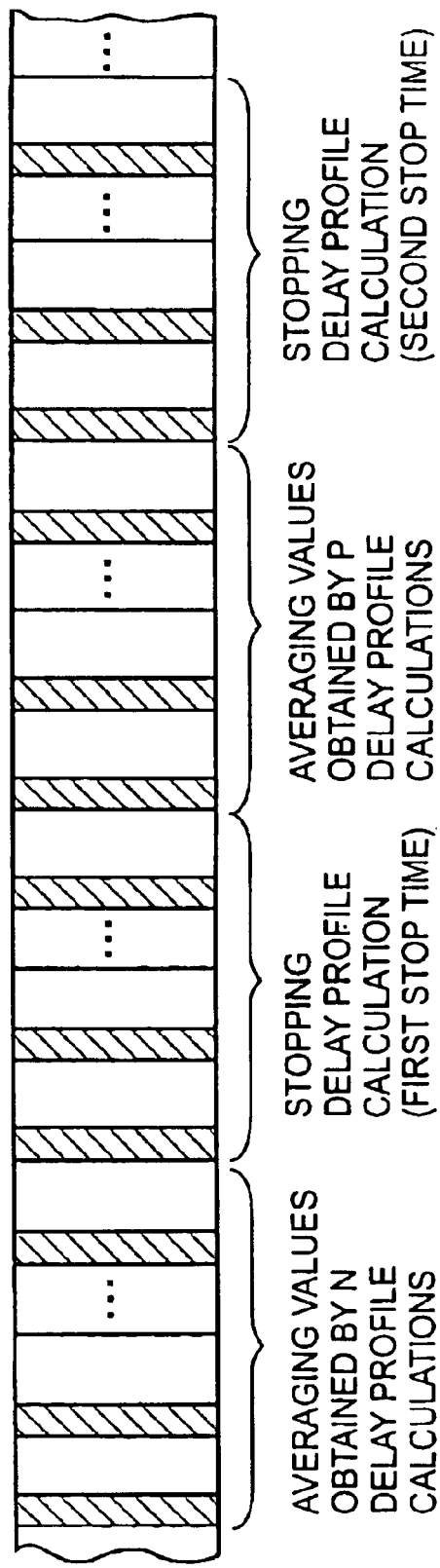

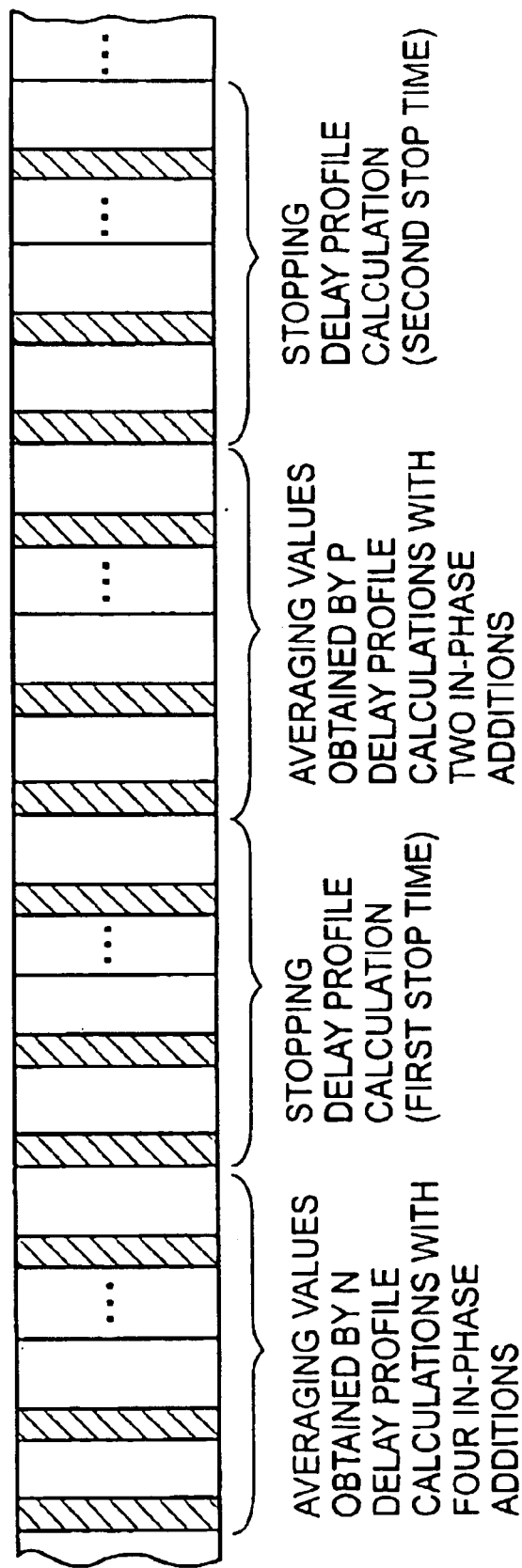

RADIO COMMUNICATION APPARATUS USED IN CDMA COMMUNICATION SYSTEM, WHICH HAS FINGERS AND IS DESIGNED TO PERFORM RAKE RECEPTION, AND POWER CONSUMPTION CONTROL METHOD THEREFOR

BACKGROUND OF THE INVENTION

1. Field of the Invention

The present invention relates to a radio communication apparatus and a power consumption control method therefor and, more specifically, to a radio communication apparatus used in a CDMA mobile communication system, which has a plurality of fingers and is desired to perform rake reception, and a power consumption control method therefor.

2. Description of the Prior Art

Recently, mobile communication systems such as a system using portable telephones have become widespread. One of the communication schemes used by such mobile communication systems is CDMA (Code Division Multiple Access).

According to CDMA, on the transmitting side, data is spread by using one of predetermined spreading codes which differ depending on the data to be transmitted, and the spread data is transmitted. On the receiving side, the data is obtained by spreading (so-called despreading) the reception signal by using a spreading code identical to the one used on the transmitting side (to be precise, a code complex conjugate to the spreading code on the transmitting side). In such communication based on CDMA, on the receiving side, the peak correlation value of a received signal is found out by shifting the despreading timing, thereby regenerating the signal transmitted from the transmitting side.

In an actual communication environment for a mobile communication system, until a signal from one base station reaches a mobile station, a plurality of paths such as direct waves and reflected waves are present. In CDMA, such multipath signals can be separated from each other to be recognized as data. Therefore, a path diversity arrangement can be used, in which fingers for despreading the respective multipath signals are arranged for the respective paths, and a rake reception section for combining signals from the respective fingers is used.

FIG. 1 is a block diagram showing a conventional demodulation circuit for performing demodulation by despreading in a CDMA mobile station.

Referring to FIG. 1, this demodulation circuit is comprised of a delay profile calculating section 11 for calculating a delay profile, a finger path allocating section 12 for operating fingers 13a and 13b on the basis of the delay profile generated by the delay profile calculating section 11, a finger section 13 constituted by the fingers 13a and 13b for despreading a reception signal, a rake reception section 14 for combining the despreading results as outputs from the fingers 13a and 13b, and a reception data processing section 15 for demodulating an output from the rake reception section 14 and outputting the resultant digital data as a demodulated output signal.

FIG. 1 shows only two fingers, i.e., the fingers 13a and 13b, for the sake of illustrative convenience. However, this circuit may have more fingers in consideration of the number of multipath signals produced.

The reception signal received by the mobile station is subjected to quadrature detection to be demodulated. The I and Q component signals of this quadrature detection output are input to the delay profile calculating section 11. The delay profile calculating section 11 generates a delay profile by calculating the correlation between the signals.

The finger path allocating section 12 searches the delay profile, calculated and generated by the delay profile calculating section 11, for peaks. Path positions are then allocated, as allocated path positions, to the fingers 13a and 13b in decreasing order of power correlation values. In the finger section 13, the fingers 13a and 13b despread signals sent over the allocated paths. The rake reception section 14 rake-combines the resultant outputs. The reception data processing section 15 demodulates the output from the rake reception section 14, and outputs the resultant digital data, which is the demodulation result, as a demodulation output signal.

As described above, in a CDMA mobile station, a demodulation circuit for performing demodulation by despreading determines paths to be allocated to the respective fingers on the basis of the delay profile generated by a delay profile calculating section.

FIG. 2 is a view for explaining an example of the timing at which delay profile calculation processing is performed in a conventional demodulation circuit.

FIG. 2 is a view showing a reception signal, in which the hatched portions represent pilot symbols (to be described later), i.e., known data portions, and the remaining portions represent information data symbol portions.

As shown in FIG. 2, in the conventional demodulation circuit, delay profile calculation is performed for each pilot symbol, and the values obtained by, for example, N calculations, are averaged, thereby obtaining a delay profile to be output from the delay profile calculating section 11 in FIG. 1.

Delay profile calculation should be done when the effective reception path position changes due to, for example, the movement of the mobile station. However, according to the conventional demodulation circuit, as described above, delay profile calculation is performed at a fixed cycle, and the effective reception path position does not always change in this cycle.

For this reason, in the conventional demodulation circuit, delay profile calculation is performed even when it is not necessary, resulting in a waste of power.

If the intervals at which delay profile calculation is performed are simply prolonged to reduce power consumption, delay profile calculation may not be performed even when it is necessary as the effective reception path position changes, resulting in a demodulation failure.

As communication terminals, like current portable telephone terminals, are required to become smaller in size with longer periods of use, increases in power consumption pose a serious problem. Demands have therefore been arisen for portable telephone terminals capable of reducing power consumption while maintaining good reception characteristics.

SUMMARY OF THE INVENTION

The present invention has been made in consideration of the above situation in the prior art, and has as its object to provide a radio communication apparatus which is used in a CDMA communication system, can reduce power consumption while maintaining good reception quality, and performs finger path allocation processing, and a power consumption control method.

In order to achieve the above object, according to the first main aspect of the present invention, there is provided a radio communication apparatus which is used in a CDMA communication system, has a plurality of fingers, and performs rake reception, comprising a delay profile calculating section for calculating a delay profile using a reception signal, and a finger path allocating section for allocating path positions to the plurality of fingers on the basis of the delay profile calculated by the delay profile calculating section, wherein a delay profile calculation cycle in the delay profile calculating section is variable.

In order to achieve the above object, according to the second main aspect of the present invention, there is a radio communication apparatus which is used in a CDMA communication system, has a plurality of fingers, and performs rake reception, comprising a delay profile calculating section for calculating a delay profile using a reception signal, a finger path allocating section for allocating path positions to the plurality of fingers on the basis of the delay profile calculated by the delay profile calculating section, a reception characteristic detecting section for detecting reception characteristics of the reception signal, and a delay profile calculation control section for controlling a delay profile calculation cycle in the delay profile calculating section on the basis of the reception characteristics detected by the reception characteristic detecting section.

In the radio communication apparatus according to the second main aspect, the reception characteristic detecting section detects a reception BER or reception SIR.

In the radio communication apparatus according to the second main aspect, the delay profile calculation control section stops delay profile calculation processing in the delay profile calculating section when the reception characteristics detected by the reception characteristic detecting section are good.

In the radio communication apparatus according to the second main aspect, the delay profile calculation control section stops delay profile calculation processing in the delay profile calculating section for a predetermined period of time in accordance with a predetermined threshold when the reception characteristics detected by the reception characteristic detecting section are good as compared with the predetermined threshold.

The delay profile calculation processing is stopped by interrupting an operation clock supplied to the delay profile calculation processing in the delay profile calculating section.

In the radio communication apparatus according to the second main aspect, the delay profile calculating section comprises a holding section, and while the delay profile calculation processing is stopped, the holding section keeps outputting a delay profile calculated immediately before the delay profile calculation processing is stopped.

In the radio communication apparatus according to the second main aspect, the delay profile calculating section calculates an average delay profile by averaging values obtained by performing delay profile calculation by a predetermined number of times, the finger path allocating section allocates path positions to the plurality of fingers on the basis of the average delay profile, and the delay profile calculation control section controls the number of times of calculations in the delay profile calculating section on the basis of the reception characteristics detected by the reception characteristic detecting section.

In addition, the delay profile calculation control section decreases the number of times of calculations in the delay profile calculating section when the reception characteristics detected by the reception characteristic detecting section improve, and increases the number of times of calculations in the delay profile calculating section when the reception characteristics deteriorate.

In order to achieve the above object, according to the third aspect of the present invention, a radio communication apparatus which is used in a CDMA communication system, has a plurality of fingers, and performs rake reception, comprising a delay profile calculating section for calculating a delay profile using a reception signal, a finger path allocating section for allocating path positions to the plurality of fingers on the basis of the delay profile calculated by the delay profile calculating section, a reception characteristic detecting section for detecting reception characteristics of the reception signal, and a delay profile calculation control section for controlling an in-phase addition count in delay profile calculation in the delay profile calculating section on the basis of the reception characteristics detected by the reception characteristic detecting section.

In the radio communication apparatus according to the third main aspect, the delay profile calculation control section decreases an in-phase addition count in the delay profile calculating section when the reception characteristics detected by the reception characteristic detecting section are good.

In the radio communication apparatus according to the third main aspect, the delay profile calculation control section sets an in-phase addition count in the delay profile calculating section to a predetermined count in accordance with a predetermined threshold when the reception characteristics detected by the reception characteristic detecting section are good as compared with the predetermined threshold.

In order to achieve the above object, according to the fourth main aspect of the present invention, there is provided a radio communication apparatus which is used in a CDMA communication system, has a plurality of fingers, and performs rake reception, comprising a delay profile calculating section for calculating a delay profile, a finger path allocating section for operating the fingers on the basis of the delay profile generated by the delay profile calculating section, a rake reception section for combining despreading results output from the plurality of fingers, a reception data processing section for demodulating an output from the rake reception section and outputting resultant digital data as a demodulated output signal, a known data table in which known data to be contained in a reception signal is stored in advance, a threshold table in which a threshold associated with an error rate of a reception signal is stored in advance, a reception data comparing section for obtaining an error rate of the reception signal by comparing known data contained in an output signal from the reception data processing section with the known data stored in the known data table, and outputting a signal in accordance with a result of comparison between the error rate and the threshold stored in the threshold table, and a delay profile calculation control section for outputting a control signal for controlling operation of the delay profile calculating section on the basis of an output from the reception data comparing section.

In order to achieve the above object, according to the fifth main aspect of the present invention, there is provided a radio communication apparatus which is used in a CDMA communication system, has a plurality of fingers, and performs rake reception, comprising a delay profile calculating section for calculating a delay profile, a finger path allocating section for operating the fingers on the basis of the delay profile generated by the delay profile calculating section, a rake reception section for combining despreading results output from the plurality of fingers, outputting the resultant data, and estimating and outputting a reception SIR, a threshold table in which a threshold associated with a reception SIR is stored in advance, a reception data comparing section for outputting a signal corresponding to a result of comparison between the reception SIR from the rake reception section and the threshold stored in the threshold table, and a delay profile calculation control section for outputting a control signal for controlling operation of the delay profile calculating section on the basis of an output from the reception data comparing section.

In order to achieve the above object, according to the sixth main aspect of the present invention, there is provided a radio communication apparatus which is used in a CDMA communication system, has a plurality of fingers, and performs rake reception, wherein reception quality is ensured and power consumption is reduced by controlling a delay profile calculation cycle for obtaining path positions allocated to the fingers on the basis of reception characteristics.

In order to achieve the above object, according to 0 the seventh main aspect of the present invention, there is provided a power consumption control method for a radio communication apparatus which is used in a CDMA communication system, has a plurality of fingers, and performs rake reception, comprising the step of receiving a radio signal, the step of calculating a reception characteristic value of the radio signal, the step of comparing the reception characteristic value with a predetermined threshold, the step of stopping delay profile calculation processing when a result of the comparison in the comparison step indicates that the reception characteristic value is larger than the predetermined threshold, the step of executing the delay profile calculation processing when the result of the comparison in the comparison step indicates that the reception characteristic value is smaller than the predetermined threshold, the step of allocating path positions to the plurality of fingers on the basis of the delay profile calculated in the execution step, and the step of despreading the radio signal by using the plurality of fingers.

As is obvious from the respective aspects described above, according to the present invention, when the reception characteristics are good, i.e., there is no need to update the paths allocated to fingers, delay profile calculation processing is not performed. This makes it possible to reduce the power consumption required for delay profile calculation processing. That is, the power consumption for allocated path position update processing can be reduced by controlling delay profile calculation.

In addition according to the present invention, since delay profile calculation processing is controlled by using reception characteristics, when the reception characteristics are poor due to large path variations, control can be performed to execute delay profile calculation processing in a short cycle. This makes it possible to follow reception path variations and obtain good reception characteristics.

The above and many other objects, features and advantages of the present invention will become manifest to those skilled in the art upon making reference to the following detailed description and the accompanying drawings in which preferred embodiments incorporating the principle of the present invention are shown by way of illustrative examples.

BRIEF DESCRIPTION OF THE DRAWINGS

FIG. 24 is a view for explaining an example of the timing of the execution of delay profile calculation processing in a combination of the second and fourth embodiments; and FIG. 25 is a view for explaining an example of the timing of the execution of delay profile calculation processing in a combination of the second, fourth, and fifth embodiments.

DETAILED DESCRIPTION OF THE PREFERRED EMBODIMENTS

A few preferred Embodiments of the present invention will be described below with reference to the accompanying drawings.

In the embodiment described below, the present invention is applied to a mobile station in a CDMA mobile communication system.

Figure 3:
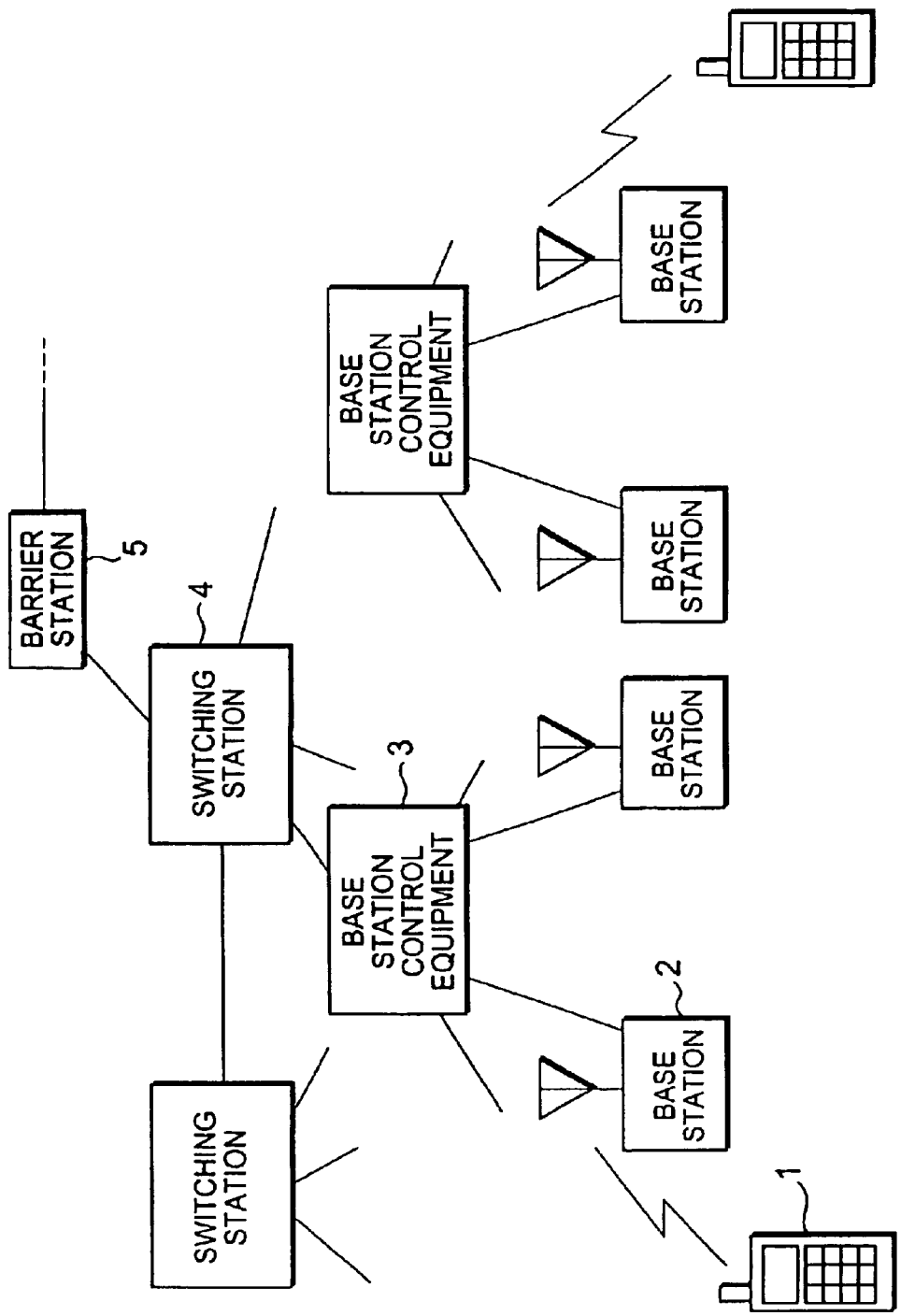
FIG. 3 is a block diagram schematically showing an example of a CDMA mobile communication system to which a mobile station having a demodulation circuit according to the present invention is applied.

FIG. 3 is a block diagram schematically showing an example of a CDMA mobile communication system to which a mobile station having a radio communication apparatus according to the present invention is applied.

ATM (Asynchronous Transfer Mode) communication techniques and the like have been applied to base stations, base station control equipment, and switching stations constituting the network side of a mobile communication system in consideration of the diversification (trends toward multimedia) of services provided by the mobile communication system and the efficient use (statistical multiplexing) of transmission paths that connect the respective base stations, base station equipment, and switching stations.

A mobile station 1 communicates with another mobile station, a terminal apparatus connected to another network, or the like through the mobile communication system. The mobile station 1 can perform various types of communications, e.g., speech communication and data communication.

Transmission data from the mobile station 1 is transmitted as communication data to a base station 2 by radio communication. The base station 2 performs various processes for the communication data received from the mobile station 1 or other mobile stations, e.g., assembling the data into ATM cells, and transmits the resultant data to base station equipment 3.

In this manner, base stations transmit information in the form of ATM cells within the network regardless of whether the communication data in a radio zone is speech data, image data, or data in other forms. This makes it possible to easily cope with multimedia communication forms.

The base station control equipment 3 routines the ATM cells received from the base station 2 in units of users, and transmits them to switching stations 4 or other subordinate base stations. The switching station 4 routines the ATM cells received from the base station control equipment 3 in units of users, and transmits them to other switching stations or a barrier station 5.

In such ATM cell transmission, ATM cells may be made to flow in a transmission path upon generation of the ATM cells. This obviates the necessity to prepare a transmission path for each predetermined channel. Therefore, a statistical multiplexing effect can be obtained, and transmission paths can be efficiently used. Note that the barrier station 5 is used to relay data to another network.

In transmitting data from the network side to the mobile station 1, the base station 2 performs primary modulation such as QPSK, then performs spread spectrum modulation as secondary modulation, and transmits the resultant data. A demodulation circuit of each embodiment (to be described later) can be applied to, for example, the mobile station 1. The mobile station 1 uses this demodulation circuit to demodulate a reception signal from the base station 2 by despreading it, thereby regenerating the data from the network side.

Figure 4:
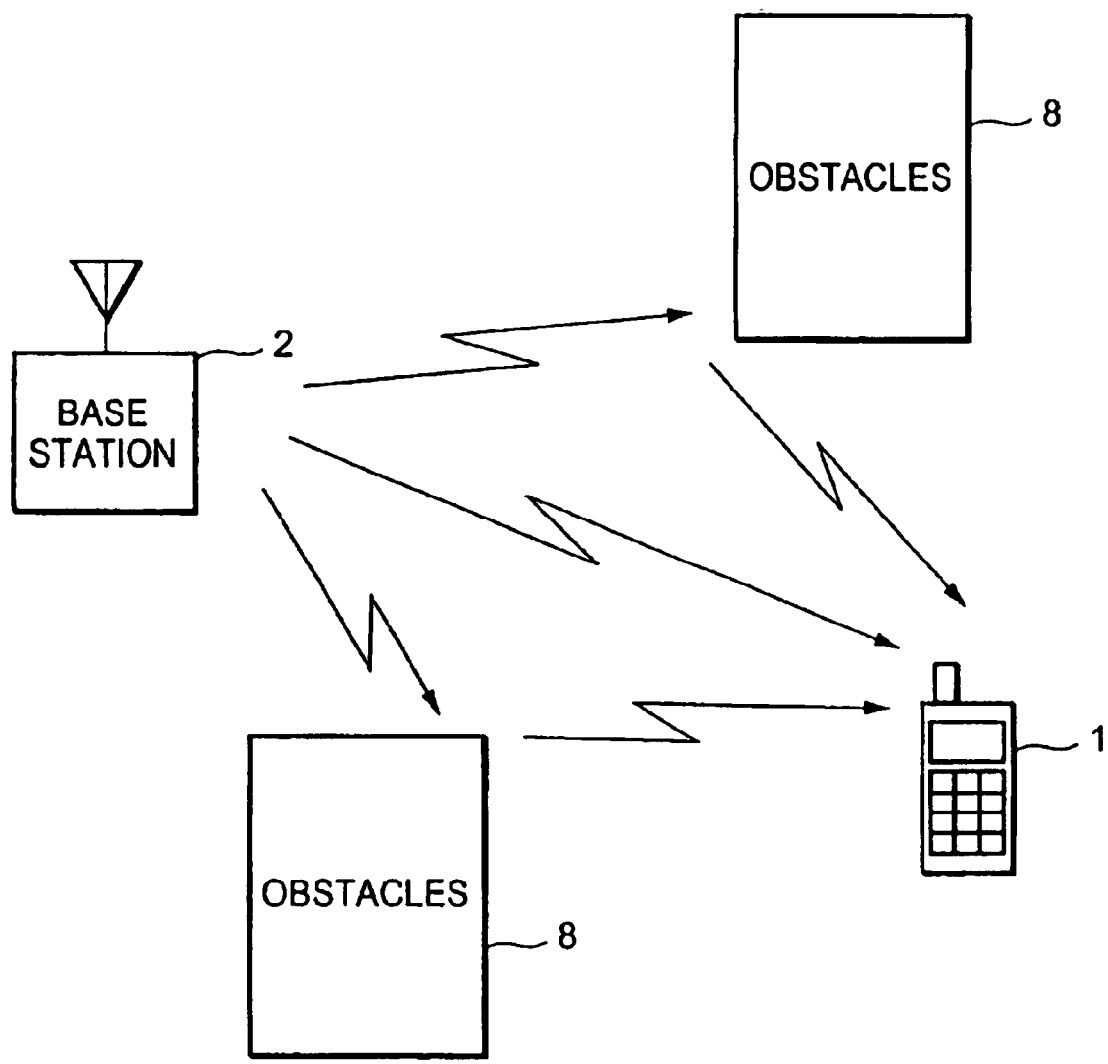
FIG. 4 is a block diagram showing an example of a communication environment for the CDMA mobile communication system to which the mobile station shown in FIG. 3 is applied.

FIG. 4 is a block diagram showing a communication environment for the CDMA mobile communication system to which the mobile station 1 shown in FIG. 3 is applied.

In an actual communication environment for the CDMA mobile communication system, as shown in FIG. 4, various obstacles 8 such as natural terrains and buildings exist between the base station 2 and the mobile station 1 in FIG. 3. For this reason, until a transmission signal transmitted from the base station 2 reaches the mobile station 1, a plurality of paths such as direct waves and waves reflected by the obstacles 8 are present. The respective reception signals received by the mobile station 1 through these paths differ in their phases, and hence the respective multipath reception signals can be regenerated by despreading them in different phases.

In CDMA, such multipath signals can be separated from each other to be recognized as data. Therefore, a path diversity arrangement can be used, in which fingers for despreading the respective multipath signals are arranged for the respective paths, and a rake reception section for combining signals from the respective fingers is used.

Figure 5:
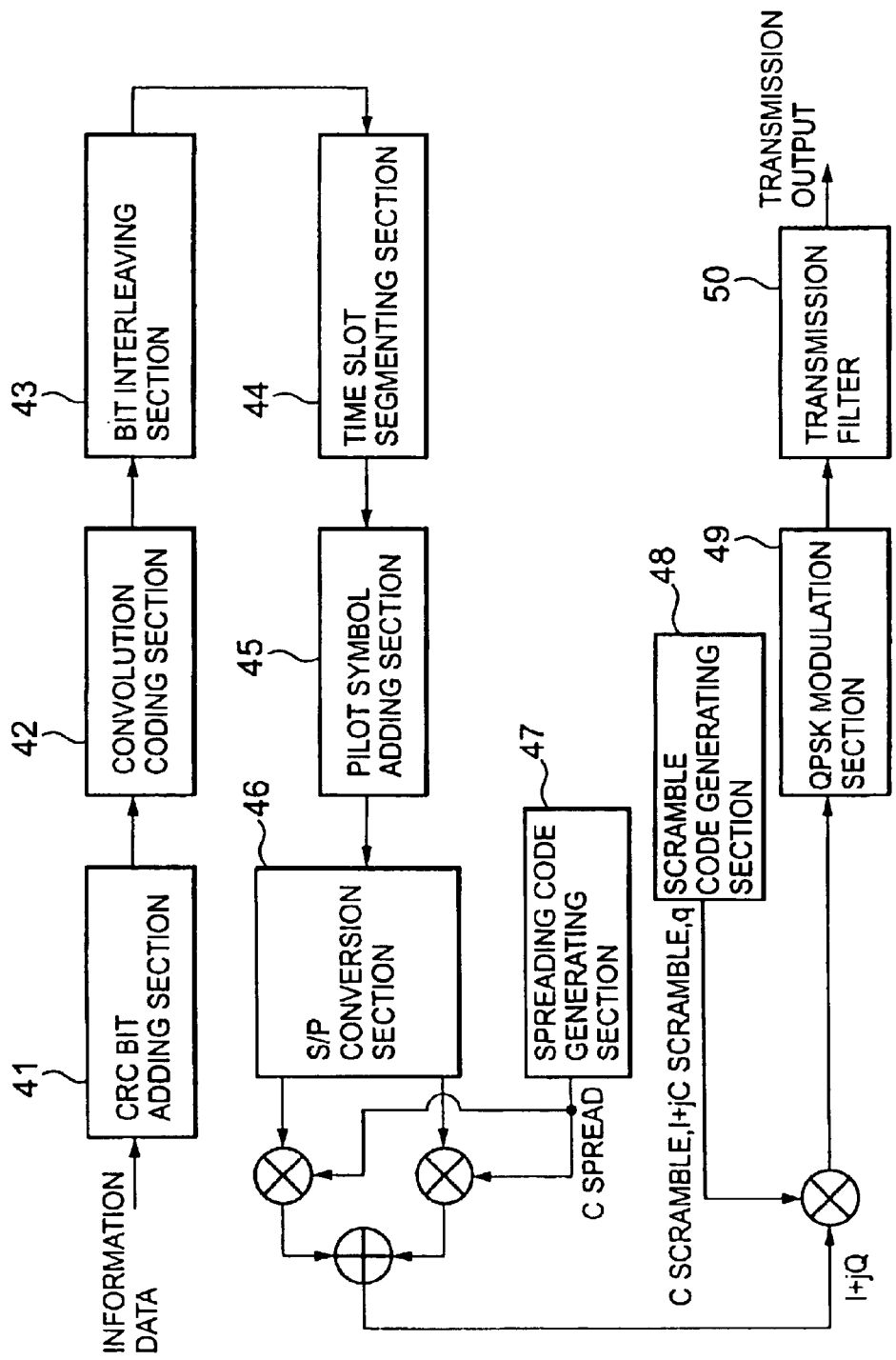
FIG. 5 is a block diagram showing an example of the internal arrangement of a base station in FIG. 3.

FIG. 5 is a block diagram showing an example of the internal arrangement of the base station 2 in FIG. 3.

A CRC bit adding section 41 adds a CRC bit for error correction to information data to be transmitted. A convolution coding section 42 performs convolution coding of the data.

A bit interleaving section 43 interleaves the output from the convolution coding section 42 to reduce the fading effects on the data. A time slot segmenting section 44 segments the data into slots. A pilot symbol adding section 45 then time-multiplexes pilot symbols with the slots to form time slots.

A serial/parallel (S/P) conversion section 46 separates each time slot into I and Q components, which are multiplied by the spreading code generated by a spreading code generating section 47. The resultant I and Q components are further complex-multiplied by the scramble code generated by a scramble code generating section 48. After a QPSK modulation section 49 performs QPSK modulation of these components, the resultant data are filtered by a transmission filter 50 to be band-limited. The resultant data are then transmitted.

Figure 6:
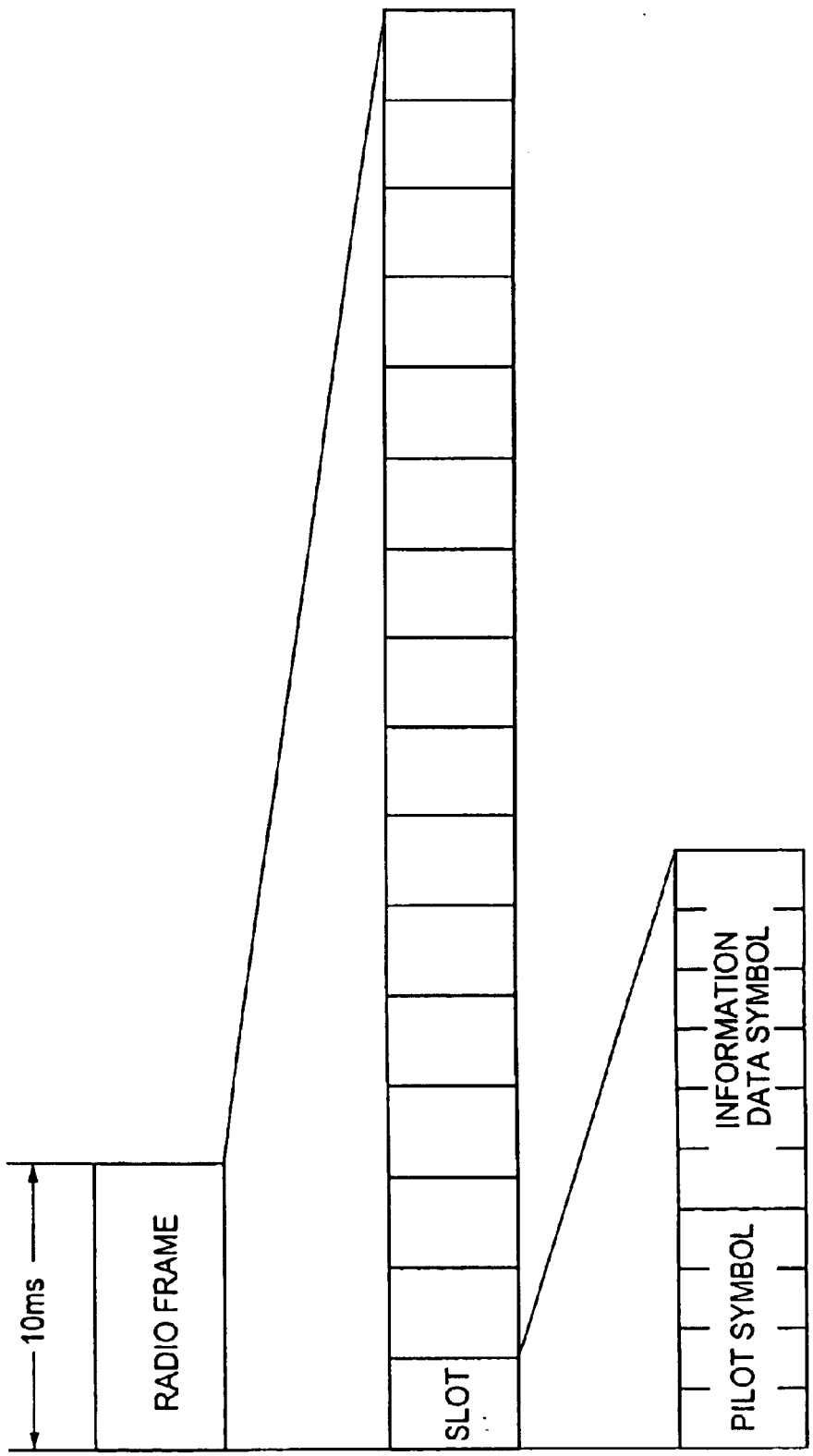
FIG. 6 is a view showing an example of the signal format of a reception signal transmitted from the base station in FIG. 3 and received by the mobile station.

FIG. 6 is a view showing an example of the format of a reception signal which is transmitted from the base station 2 in FIG. 3 and received by the mobile station 1.

As shown in FIG. 6, a 10-ms long radio frames are continuously transmitted from the base station 2. One radio frame is constituted by 16 slots. One slot is constituted by 10 symbols. 10 symbols constituting one slot include four pilot symbols and six information data symbols.

A pilot symbol is known data predetermined by the communication system. A demodulation circuit of each embodiment of the present invention calculates a delay profile by using this known data. An information data symbol is actual data to be actually transmitted/received in communication between terminals.

In the following description, pilot symbols are used as known data for delay profile calculation. However, the present invention is not limited to this. Obviously, any data such as data to be newly inserted can be used as known data for delay profile calculation as long as the data is a data portion of a signal transmitted from the base station 2 which is known by the mobile station 1 in advance.

Figure 7:
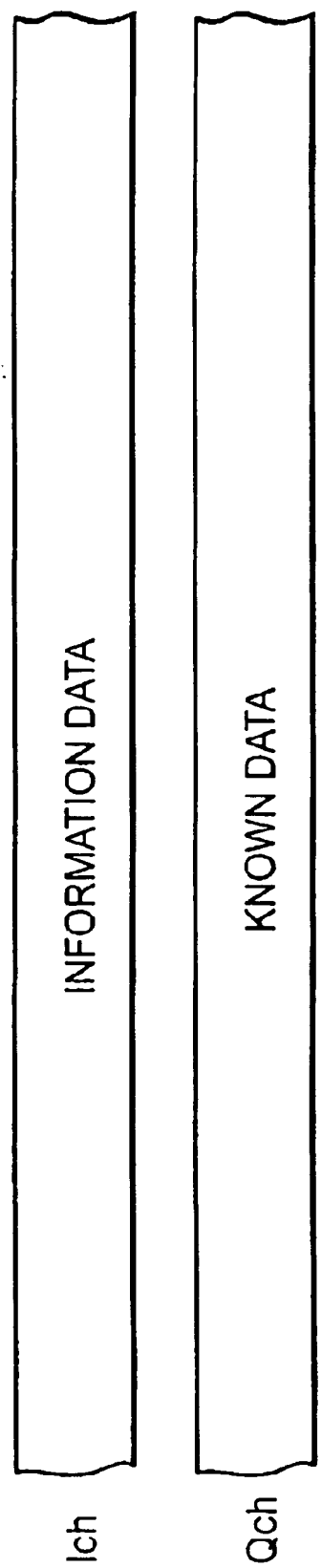
FIG. 7 is a view showing an example of a signal format which is different from the signal format in FIG. 6 and in which known data is inserted in a reception signal received by the mobile station.

FIG. 7 shows an example of the format of a signal obtained by inserting known data into a reception signal received by the mobile station 1. This format differs from the signal format shown in FIG. 6.

In the format shown in FIG. 7, information data and known data are respectively superimposed on the I and Q components of the reception signal received by the mobile station 1.

The present invention can be applied to both the case shown in FIG. 6 and the case shown in FIG. 7.

Figure 8:
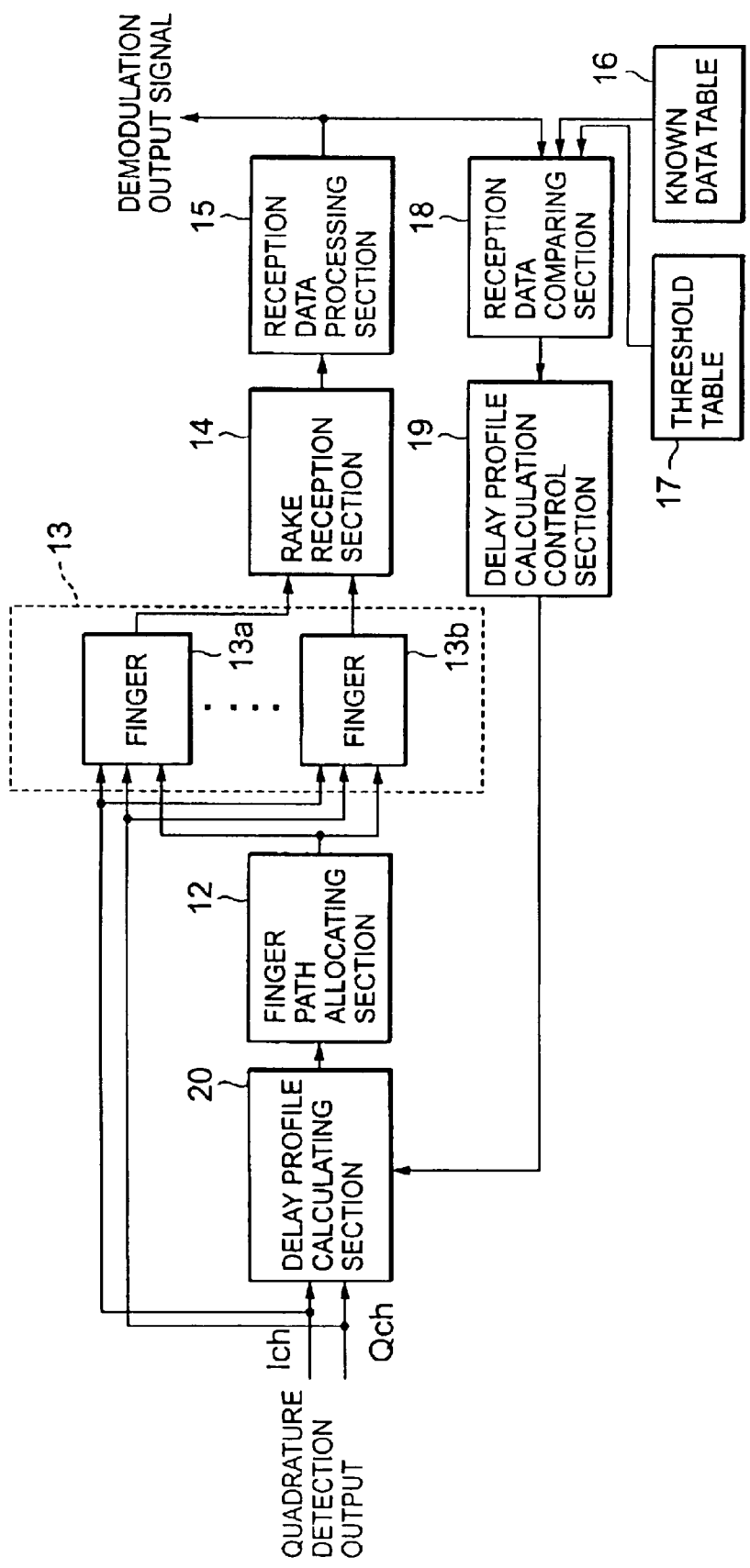
FIG. 8 is a block diagram showing the first embodiment of a demodulation circuit which performs demodulation by despreading and serves as a radio communication apparatus according to the present invention in a CDMA mobile station.

FIG. 8 is a block diagram showing the first embodiment of a demodulation circuit which performs demodulation by despreading and serves as a radio communication apparatus according to the present invention in a CDMA mobile station.

Referring to FIG. 8, this demodulation circuit is comprised of a delay profile calculating section 20 for calculating a delay profile, a finger path allocating section 12 for operating fingers 13a and 13b on the basis of the delay profile generated by the delay profile calculating section 20, a finger section 13 constituted by the fingers 13a and 13b for despreading reception signals, a rake reception section 14 for combining the despreading results as the outputs from the fingers 13a and 13b, a reception data processing section 15 for demodulating the output from the rake reception section 14 and outputting the resultant digital data as a demodulated output signal, a reception characteristic detection unit constituted by a known data table 16 in which known data (e.g., pilot symbols) to be contained in reception signals is stored in advance, a threshold table 17 in which a threshold associated with reception signal error rates is stored in advance, and a reception data comparing section 18 for obtaining the error rate of a reception signal by comparing known data contained in an output signal from the reception data processing section 15 with know data stored in the known data table 16, comparing the obtained error rate with the threshold stored in the threshold table 17, and outputting a signal corresponding to the comparison result, and a delay profile calculation control section 19 for outputting a control signal for controlling the operation of the delay profile calculating section 20 on the basis of the output from the reception data comparing section 18.

FIG. 8 shows only two fingers, i.e., the fingers 13a and 13b, for the sake of illustrative convenience. However, this circuit may have more fingers in consideration of the number of multipath signals produced.

The reception signal received by the mobile station is subjected to quadrature detection to be demodulated. The I and Q component signals of this quadrature detection output are input to the delay profile calculating section 20. The delay profile calculating section 20 generates a delay profile by calculating the correlation between the signals.

The finger path allocating section 12 searches the delay profile, calculated and generated by the delay profile calculating section 20, for peaks. Path positions are then allocated, as allocated path positions, to the fingers 13a and 13b in the decreasing order of power correlation value. In the finger section 13, the fingers 13a and 13b despread signals sent over the allocated paths. The rake reception section 14 rake-combines the resultant outputs. The reception data processing section 15 demodulates the output from the rake reception section 14, and outputs the resultant digital data, which is the demodulation result, as a demodulation output signal.

The reception data comparing section 18 as a component of the reception characteristic detection unit compares the know data portion of the output signal from the reception data processing section 15 with the know data read out from the known data table 16, and calculates the reception BER (Bit Error Rate) of the known data portion of the reception signal.

The reception data comparing section 18 compares the calculated reception BER with the threshold read out from the threshold table 17. If the calculated reception BER is equal to or lower than the threshold (i.e., the reception state is good), the reception data comparing section 18 outputs a signal representing the corresponding information (this signal will be referred to as a "reception good signal" hereinafter).

The delay profile calculation control section 19 performs processing (to be described later) on the basis of the signal form the reception data comparing section 18, and outputs a delay profile calculation control signal for controlling the operation of the delay profile calculating section 20 to the delay profile calculating section 20.

Figure 9:
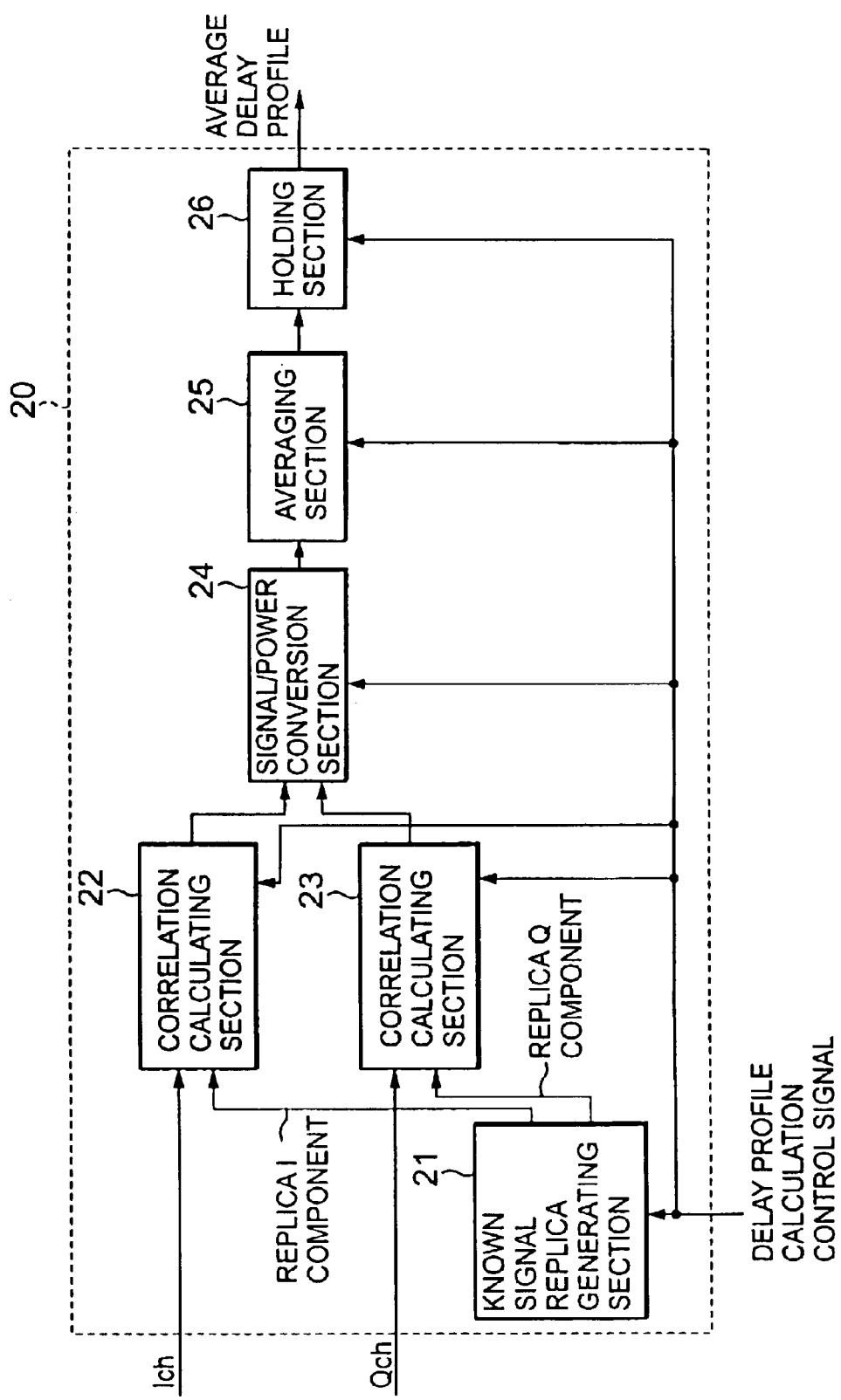
FIG. 9 is a block diagram showing an example of the internal arrangement of a delay profile calculating section in FIG. 8.

FIG. 9 is a block diagram showing an example of the internal arrangement of the delay profile calculating section 20 in FIG. 8.

As shown in FIG. 9, the delay profile calculating section 20 is comprised of a known signal replica generating section 21 for generating a known signal replica by spreading known data, and outputting the replica, a correlation calculating section 22 for calculating the correlation between the I component of a quadrature detection output and the I component of the known signal replica, a correlation calculating section 23 for calculating the correlation between the Q component of the quadrature detection output and the Q component of the known signal replica, a signal/power conversion section 24 for converting the signals into power values by using the outputs from the correlation calculating sections 22 and 23, an averaging section 25 for averaging the signals converted into the power values throughout a plurality of slots, and a holding section 26 for holding the signal from the averaging section 25 and outputting it as an average delay profile.

The known signal replica generating section 21 stores known data in advance, like the known data table 16 in FIG. 8, and generates a known signal replica by spreading the known data, stored in advance, by a method similar to the spread spectrum modulation method in the base station 2 in FIG. 5.

The correlation calculating sections 22 and 23 respectively calculate the correlations between the I components of the quadrature detection output and known signal replica and between their Q components. The output signals from the correlation calculating sections 22 and 23 are converted into power values by the signal/power conversion section 24. For example, this conversion is performed by computing $I^2+Q^2$ to increase the S/N ratio.

The averaging section 25 then averages signals, of the output signals from the signal/power conversion section 24, which correspond to a plurality of slots shown in FIG. 6, and outputs the resultant data as an average delay profile. The reason why such averaging operation is performed is that, for example, only 1-slot data may result in an incorrect delay profile due to the influences of sporadic noise and the like. The holding section 26 holds the output from the averaging section 25 and generally outputs it without any change.

A delay profile calculation control signal from the delay profile calculation control section 19 in FIG. 8 is input to each block in the delay profile calculating section 20 and acts to stop the operation of each block. Only the holding section 26 does not stop operating even when the delay profile calculation control signal is input. When the delay profile calculation control signal is input, the holding section 26 holds the signal input from the averaging section 25 immediately before the reception of the delay profile calculation control signal, and keeps outputting the held signal.

The delay profile calculation control section 19 in FIG. 8 outputs a delay profile calculation control signal for controlling the operation of the delay profile calculating section 20 on the basis of a signal from the reception data comparing section 18. This processing will be described below.

Figure 10:
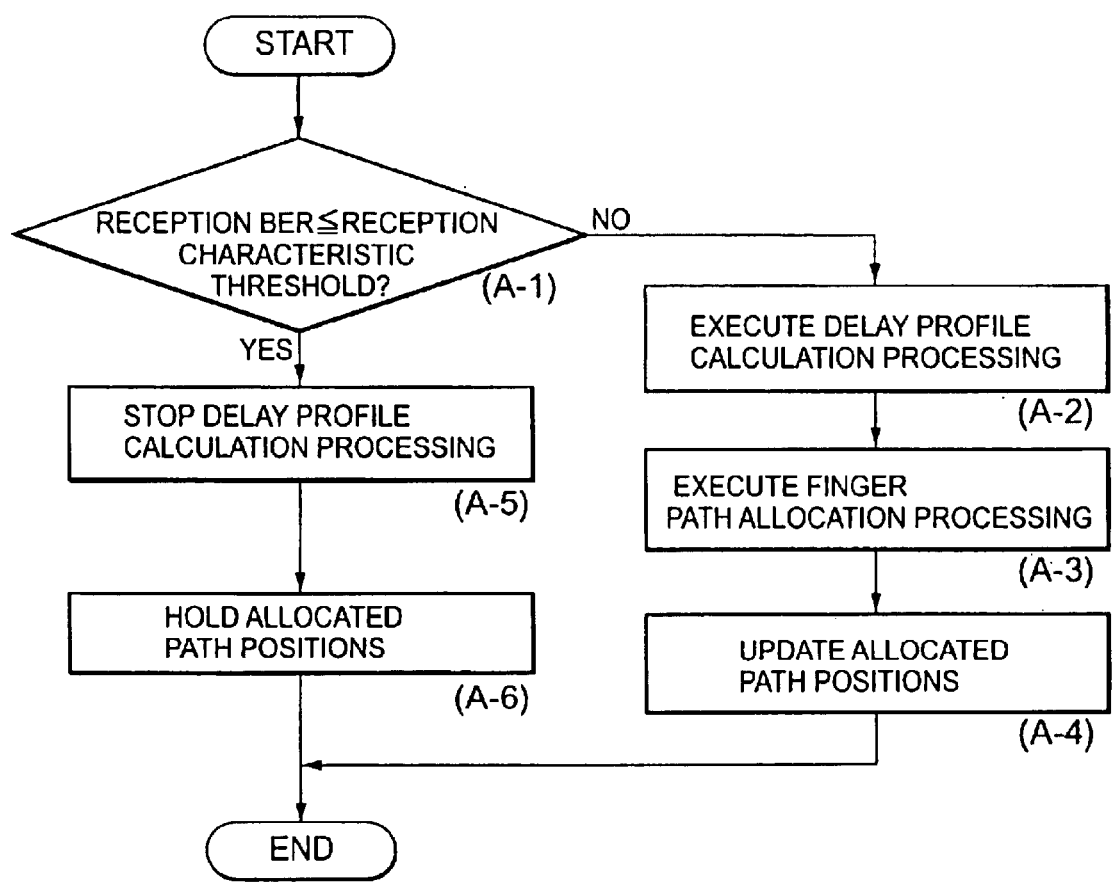
FIG. 10 is a flow chart showing an example of the processing of controlling the operation of the delay profile calculating section in FIG. 8.

FIG. 10 is a flow chart showing an example of the processing of controlling the operation of the delay profile calculating section 20 in FIG. 8.

First of all, the delay profile calculation control section 19 checks whether the reception BER is equal to or lower than the threshold stored in the threshold table 17 (step A-1). This determination is performed by receiving the above reception good signal from the reception data comparing section 18 in FIG. 8. That is, in step A-1, when the reception good signal is input, it is determined that the reception BER is equal to or lower than the reception characteristic threshold.

If it is determined in step A-1 that the reception BER is not equal to or lower than the reception characteristic threshold, the delay profile calculation control section 19 outputs no delay profile calculation control signal, and the delay profile calculating section 20 normally operates. That is, the delay profile calculating section 20 executes the above delay profile calculation processing (step A-2), and the finger path allocating section 12 executes finger path allocation processing on the basis of the delay profile from the delay profile calculating section 20 (step A-3), thereby updating the path positions in the fingers 13a and 13b of the finger section 13 (step A-4).

If it is determined in step A-1 that the reception BER is equal to or lower than the reception characteristic threshold, i.e., the delay profile calculation control section 19 in FIG. 8 receives a reception good signal from the reception data comparing section 18, the delay profile calculation control section 19 outputs a delay profile calculation control signal to the delay profile calculating section 20.

Upon receiving the delay profile calculation control signal, the delay profile calculating section 20 stops the operations of the known signal replica generating section 21, correlation calculating section 22, correlation calculating section 23, signal/power conversion section 24, and averaging section 25 and causes the holding section 26 to hold the delay profile input to the averaging section 25 immediately before the delay profile calculation control signal is input and keep outputting the held delay profile (step A-5).

As a means for stopping the operations of the respective blocks, i.e., the known signal replica generating section 21, correlation calculating section 22, correlation calculating section 23, signal/power conversion section 24, and averaging section 25 in the delay profile calculating section 20, a means for interrupting power supplied to the respective blocks or a means for stopping the supply of operation clocks to the respective blocks may be used.

If each block in the delay profile calculating section 20 is implemented by software, power supplied to a DSP (Digital Signal Processor) for executing the software may be interrupted, or the supply of operation clocks to the DSP or the like may be stopped.

The finger path allocating section 12 in FIG. 8 allocates path positions to the fingers 13a and 13b of the finger section 13 on the basis of the delay profile which is held in the holding section 26 and output therefrom in step A-5 and obtained immediately before the delay profile calculation is stopped (step A-6). That is, in this state, the path position allocation is not changed, and the immediately preceding state is held.

In the case shown in FIG. 10, if it is determined in step A-1 that the reception BER is equal to or lower than the reception characteristic threshold, control is performed to stop the delay profile calculation processing. However, the present invention is not limited to this. For example, the delay profile calculation processing may be stopped for the first time when a state wherein the reception BER is equal to or lower than the reception characteristic threshold continues a plurality of number of times. This operation is performed to determine whether reception will be performed in a good, stable state.

When it is determined that reception is good, it can be determined that despreading is performed while appropriate path positions are allocated to the finger section 13. That is, there is no need to update the allocated path positions, and hence the allocated path update processing can be stopped. This makes it possible to reduce power consumption while maintaining good reception quality.

If the delay profile calculation processing is stopped in step A-5 in FIG. 10, since the path will change when, for example, the mobile station 1 moves, the delay profile calculation processing must be resumed afterward under some conditions. This processing will be described below.

Figure 11:
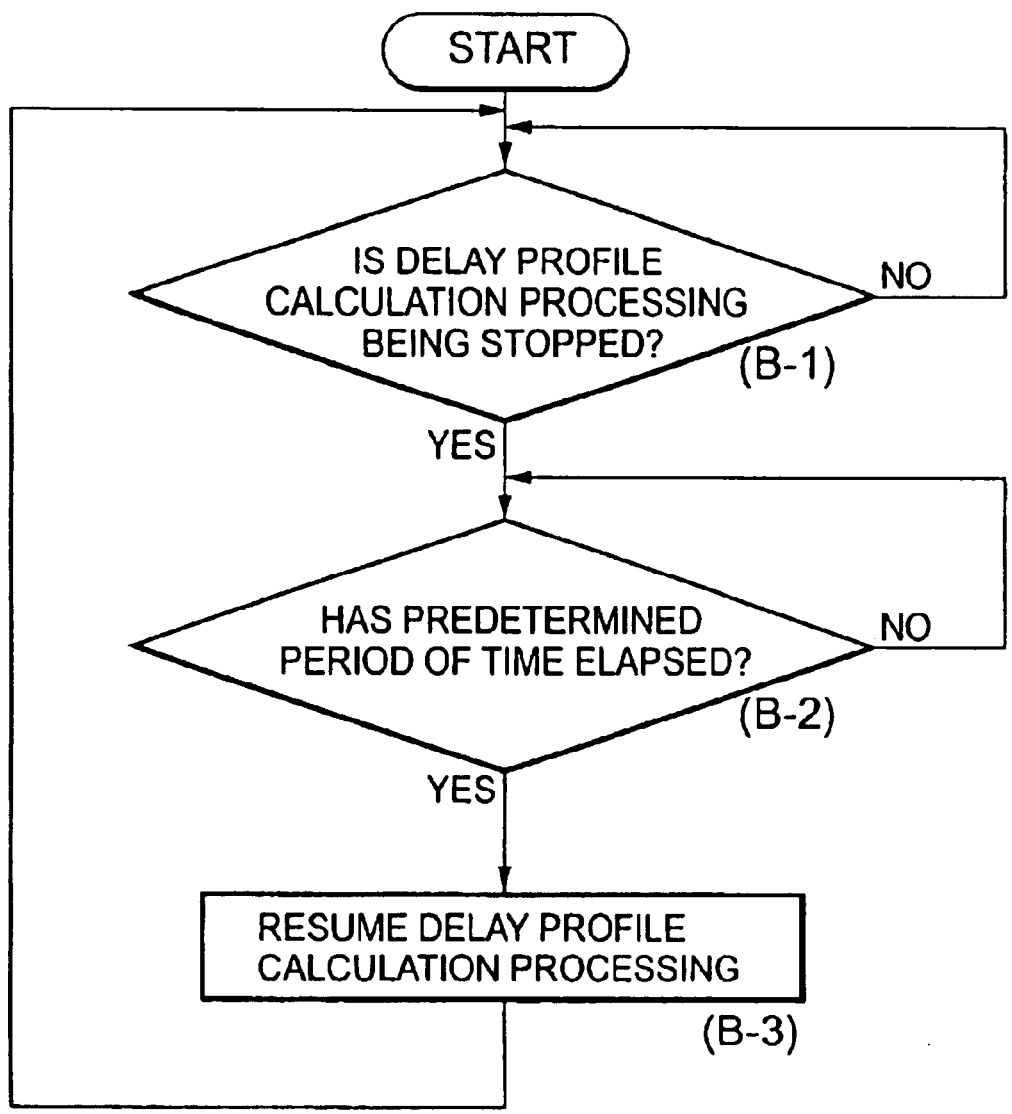
FIG. 11 is a flow chart showing an example of the processing of controlling stoppage and resumption of delay profile calculation processing in the delay profile calculating section in FIG. 8.

FIG. 11 is a flow chart showing an example of the processing of controlling stoppage and resumption of delay profile calculation processing in the delay profile calculating section 20 in FIG. 8.

The processing shown in FIG. 11 may be executed by, for example, the delay profile calculation control section 19 in FIG. 8, and may be executed as interrupt processing with respect to the processing shown in FIG. 10.

In step B-1, it is checked whether delay profile calculation processing is currently stopped. If NO in step B-1, the flow waits until YES is obtained in step B-1.

If it is determined in step B-1 that delay profile calculation processing is being stopped, the flow waits until a predetermined period of time elapses after the delay profile calculation processing is stopped (step B-2). When this predetermined period of time has elapsed, the delay profile calculation processing is resumed (step B-3).

In FIG. 11, the flow waits for a lapse of the predetermined period of time without performing any operation in step B-2.

However, the present invention is not limited to this. For example, if it is determined in step B-2 that the predetermined period of time has not elapsed, the processing in step A-1 and the subsequent steps may be performed to determine execution or stoppage of delay profile calculation processing on the basis of the latest reception characteristics.

The timing of the execution of delay profile calculation processing will be described next.

Figure 1:
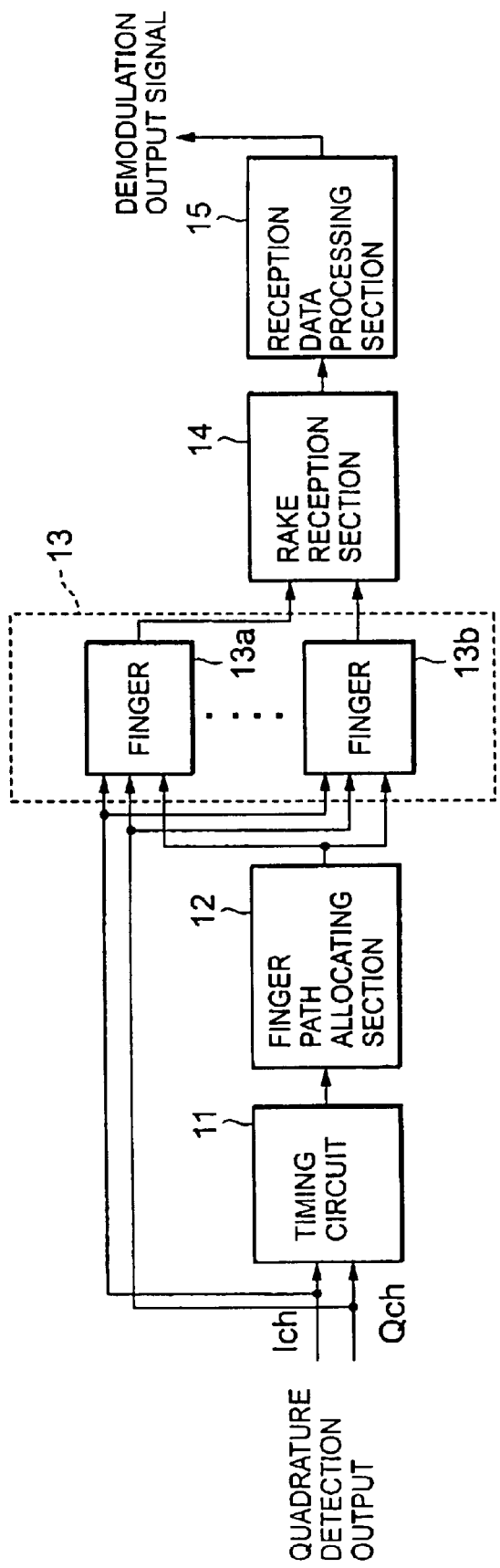
FIG. 1 is a block diagram showing a conventional demodulation circuit for performing demodulation by despreading in a CDMA mobile station.
Figure 2:
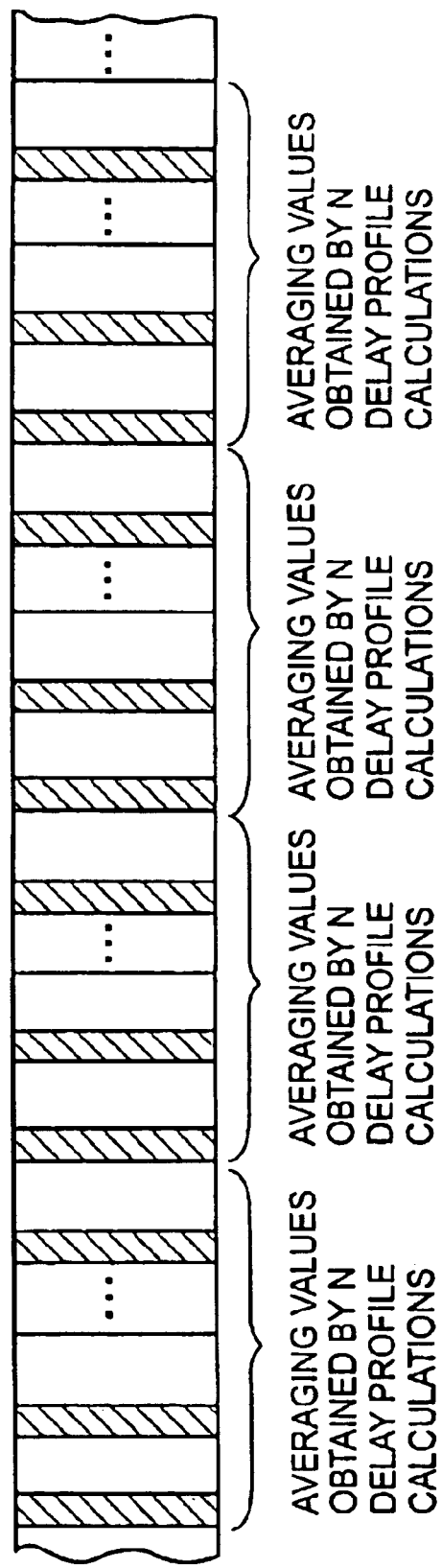
FIG. 2 is a view showing an example of the timing of the execution of delay profile calculation processing in the conventional demodulation circuit.

As shown in FIG. 2, the conventional demodulation circuit performs delay profile calculation for each pilot symbol, and averages the values obtained by, for example, N calculations, thereby obtaining a delay profile to be output from the timing circuit 11 in FIG. 1.

The timing of the execution of delay profile calculation processing in the first embodiment will be described below in comparison with the above timing.

Figure 12:
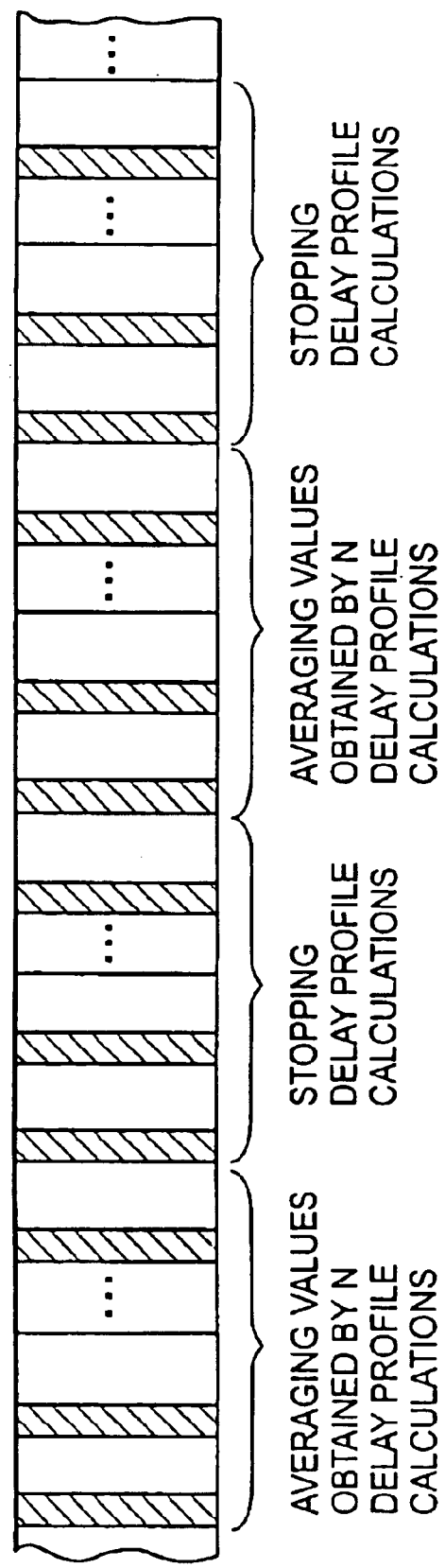
FIG. 12 is a view for explaining an example of the timing of the execution of delay profile calculation processing in the first embodiment of the present invention in FIG. 8.

FIG. 12 is a view for explaining an example of the timing of the execution of delay profile calculation processing in the first embodiment in FIG. 8.

Similar to FIG. 2, FIG. 12 is a view showing a reception signal, in which the hatched portions represent pilot symbols in FIG. 6, i.e., known data portions, and the remaining portions represent information data symbol portions.

As shown in FIG. 12, in the demodulation circuit according to the first embodiment, delay profile calculation is performed for each pilot symbol first, and then the values obtained by, for example, N calculations are averaged, thereby obtaining a delay profile to be output from the delay profile calculating section 20 in FIG. B. If it is determined by the above processing that the reception BER is good, the delay profile calculation processing is stopped. After a lapse of a predetermined period of time, the delay profile calculation processing is resumed.

The second embodiment of the present invention will be described next.

Figure 13:
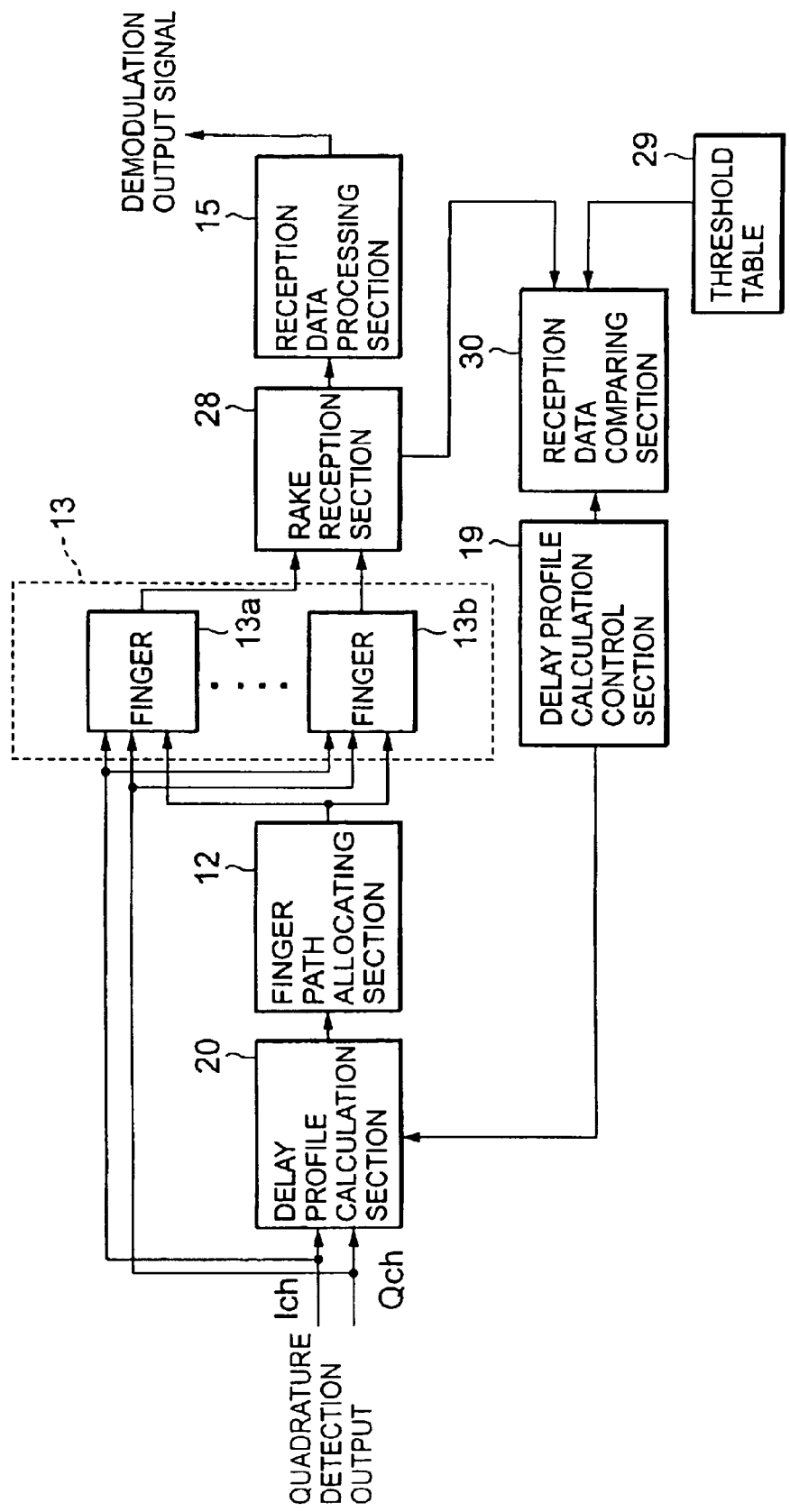
FIG. 13 is a block diagram showing the second embodiment of a demodulation circuit which performs demodulation by despreading and serves as a radio communication apparatus according to the present invention in a CDMA mobile station.

FIG. 13 is a block diagram showing the second embodiment of a demodulation circuit which performs demodulation by despreading and serves as a radio communication apparatus according to the present invention in a CDMA mobile station.

Referring to FIG. 13, this demodulation circuit is comprised of a delay profile calculating section 20 for calculating a delay profile, a finger path allocating section 12 for operating fingers 13a and 13b on the basis of the delay profile generated by the delay profile calculating section 20, a finger section 13 constituted by the fingers 13a and 13b for despreading reception signals, a rake reception section 28 for combining the despreading results as the outputs from the fingers 13a and 13b, outputting the resultant data, and estimating and outputting a reception SIR (Signal to Interference Ratio), a reception data processing section 15 for demodulating the output from the rake reception section 28 and outputting the resultant digital data as a demodulated output signal, a threshold table 29 in which a threshold associated with reception SIRs is stored in advance, a reception data comparing section 30 for comparing a reception SIR from the rake reception section 28 with the threshold stored in the threshold table 29, and outputting a signal in accordance with the comparison result, and a delay profile calculation control section 19 for outputting a control signal for controlling the operation of the delay profile calculating section 20 on the basis of the output from the reception data comparing section 30.

FIG. 13 also shows only two fingers, i.e., the fingers 13a and 13b, for the sake of illustrative convenience. However, this circuit may have more fingers in consideration of the number of multipath signals produced. The same reference numerals as in FIG. 8 denote the same parts in FIG. 13.

The reception signal received by the mobile station is subjected to quadrature detection to be demodulated. The I and Q component signals of this quadrature detection output are input to the delay profile calculating section 20. The delay profile calculating section 20 generates a delay profile by calculating the correlation between the signals.

The finger path allocating section 12 searches the delay profile, calculated and generated by the delay profile calculating section 20, for peaks. Path positions are then allocated, as allocated path positions, to the fingers 13a and 13b in decreasing order of power correlation values. In the finger section 13, the fingers 13a and 13b despread signals sent over the allocated paths. The rake reception section 28 rake-combines the resultant outputs. The reception data processing section 15 demodulates the output from the rake reception section 28, and outputs the resultant digital data, which is the demodulation result, as a demodulation output signal.

The reception characteristic detection function in the second embodiment will be described below. The rake reception section 28 further estimates and outputs the reception SIR of the current reception signal. The reception data comparing section 30 compares the reception SIR from the rake reception section 28 with the threshold read out from the threshold table 29. If the reception SIR is equal to or higher than the threshold (i.e., the reception state is good), the reception data comparing section 30 outputs a reception good signal representing the corresponding information as in the first embodiment.

An example of how the rake reception section 28 estimates a reception SIR will be described below.

Figure 14:
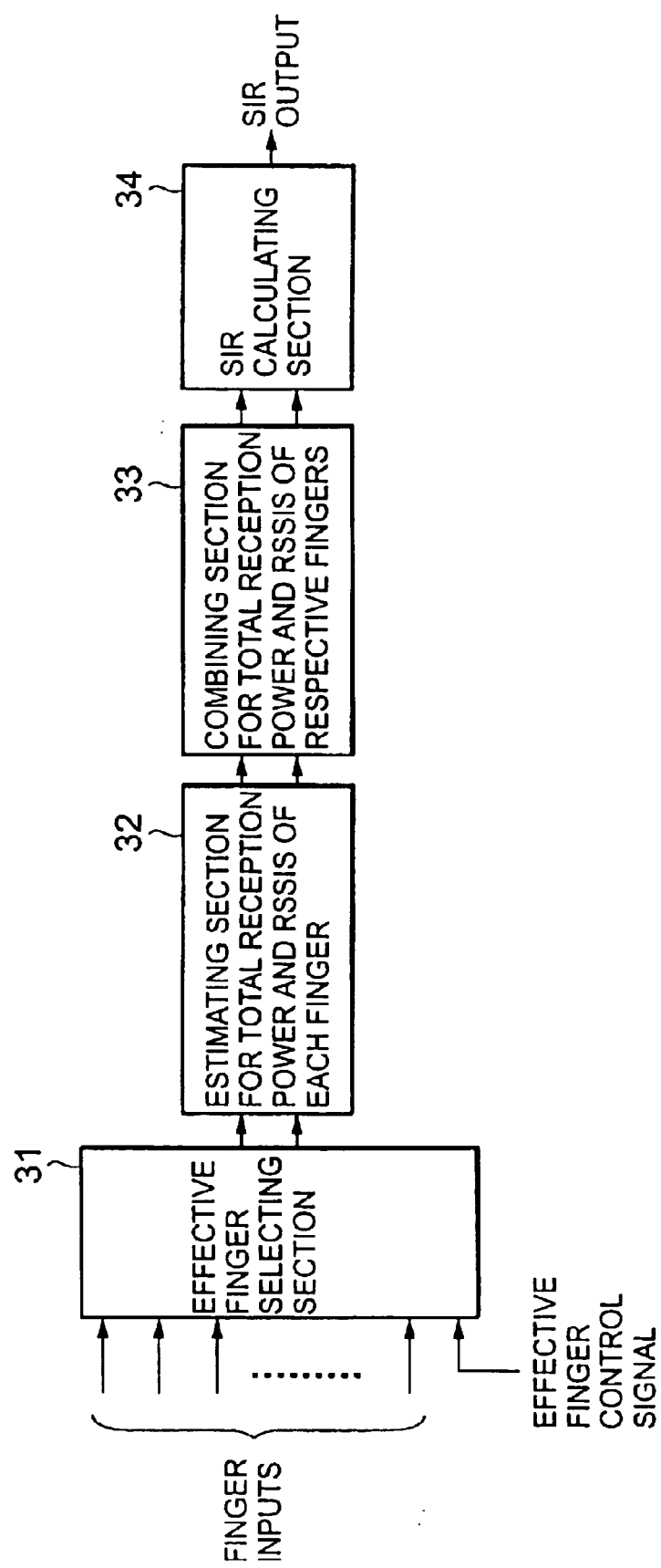
FIG. 14 is a block diagram showing an example of the internal arrangement of a rake reception section in FIG. 13.

FIG. 14 is a block diagram showing an example of the internal arrangement of the rake reception section 28 in FIG. 13.

Despreading results from the respective fingers are input to the rake reception section 28, and only the data from effective fingers by an effective finger selecting section 31. The data from the effective fingers are input to an estimating section 32 for total reception power and RSSI of each finger. The estimating section 32 for total reception power and RSSI of each finger estimates a total reception power TOTAL_POWER$_N$ and RSSI$_N$ (Received Signal Strength Indicator) of each finger according to equations (1) and (2). In these equations, the subscript N represents a finger number.

$$\text{TOTAL\_POWER}_N = \frac{\sum_{I=0}^{M-1}(I_{N,I} + jQ_{N,I})^2}{M} \quad (1)$$

$$RSSI_N = \left(\frac{\sum_{I=0}^{M-1} I_{N,I}}{M}\right)^2 + \left(\frac{\sum_{I=0}^{M-1} Q_{N,I}}{M}\right)^2 \quad (2)$$

In equations (1) and (2), N is a finger number, and M is an average symbol count.

The total reception powers and RSSIs of the respective fingers, estimated by the estimating section 32 for total reception power and RSSI of each finger, are combined by a combining section 33 for total reception powers and RSSIs of the respective fingers by using a well-known maximum ratio combining method, thereby obtaining TOTAL_POWER and RSSI. An SIR calculating section 34 obtains an interference component ISSI (Interference Signal Strength Indicator) by using the outputs from the combinig section 33 for total reception powers and RSSIs of the respective fingers according to equation (3):

$$ISSI = TOTAL\_POWER - RSSI \quad (3)$$

In general, in obtaining an SIR, an interference component ISSI is determined in consideration of a past interference component, as indicated by equation (4). In equation (4), $ISS_i$ is the current ISSI, and $ISSI_{i-1}$ is the preceding ISSI.

$$ISSI_i = \lambda \times ISSI_i + (1-\lambda) \times ISSI_{i-1} \quad (4)$$

where A is an oblivion coefficient.

Finally, an SIR is calculated by $$SIR = RSSI/ISSI_i \quad (5)$$

Referring back to FIG. 13, the delay profile calculation control section 19 and delay profile calculating section 20 are identical to the delay profile calculation control section 19 and delay profile calculating section 20 shown in FIGS. 8 and 9, and hence a description thereof will be omitted.

In the second embodiment, a reception SIR is used as a criterion for determining whether reception characteristics are good. However, the present invention is not limited to this. For example, any indicator representing reception characteristics, e.g., a reception RSSI (Received Signal Strength Indicator) can be used.

The third embodiment of the present invention will be described next.

Figure 15:
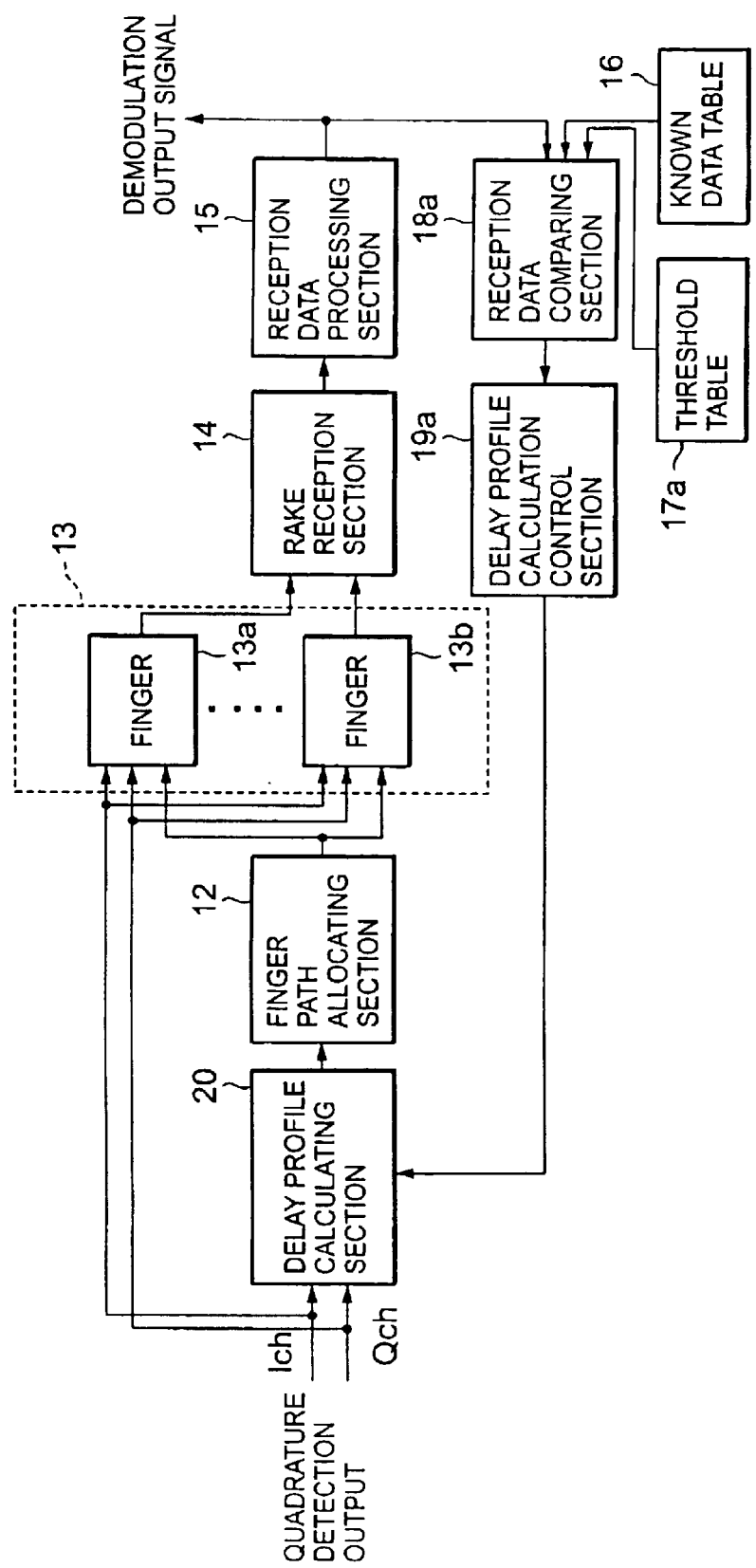
FIG. 15 is a block diagram showing the third embodiment of a demodulation circuit which performs demodulation by despreading and serves as a radio communication apparatus according to the present invention in a CDMA mobile station.

FIG. 15 is a block diagram showing the third embodiment of a demodulation circuit which performs demodulation by despreading and serves as a radio communication apparatus according to the present invention in a CDMA mobile station.

The same reference numerals as in FIG. 8 denote the same parts in FIG. 15, and a detailed description thereof will be omitted.

In the third embodiment, a delay profile calculating section 20 has the same internal arrangement as that shown in FIG. 9, and hence will be described with reference to FIG. 9.

According to the reception characteristic detection function of the third embodiment, a first threshold and a second threshold lower than the first threshold are stored in a threshold table 17a in FIG. 15 in advance. A reception data comparing section 18 outputs a first reception good signal when a reception BER is equal to or lower than the first threshold, and outputs a second reception good signal when a reception BER is equal to or lower than the second threshold.

The operation of the third embodiment will be described with reference to the flow chart of FIG. 16.

Figure 16:
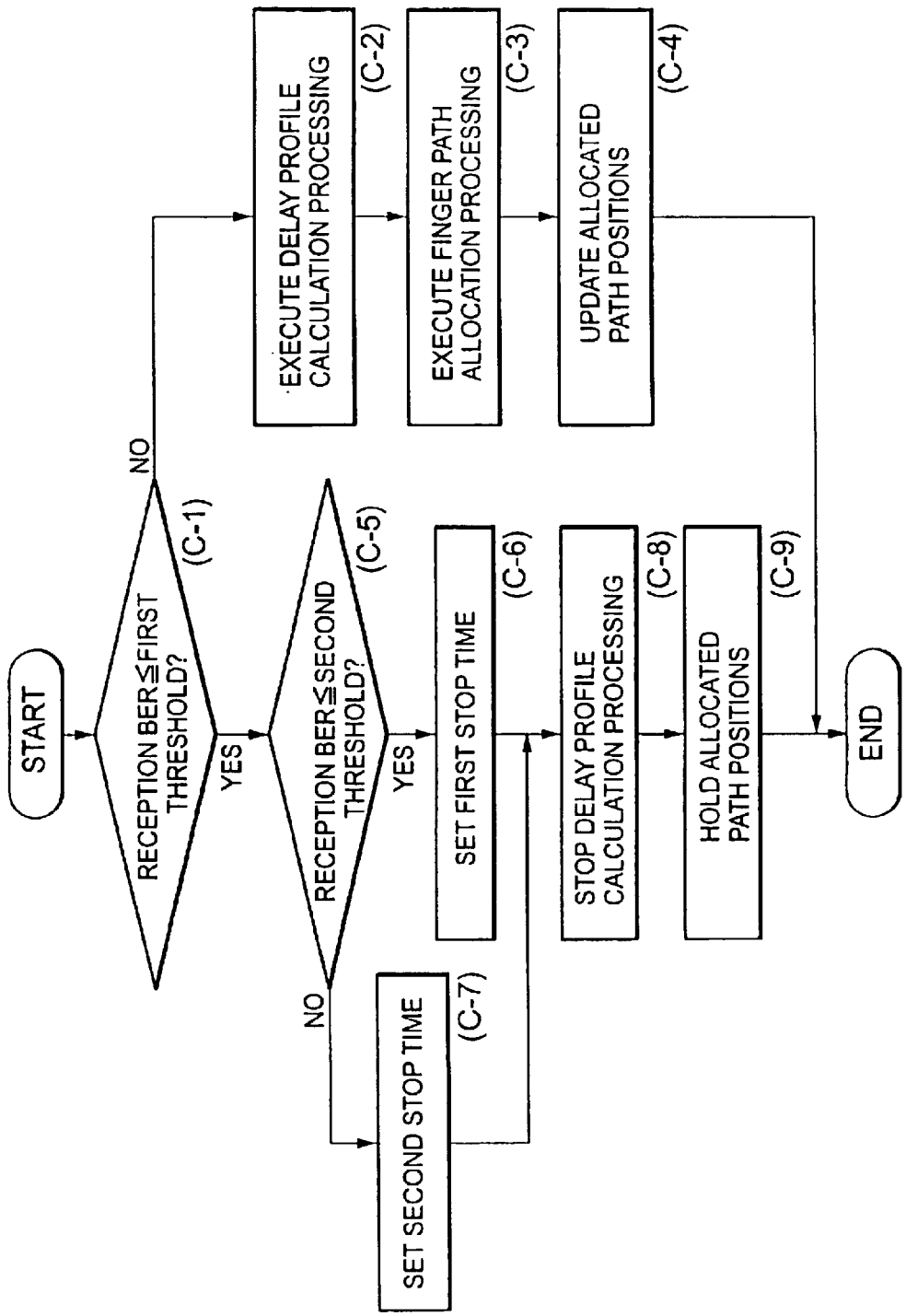
FIG. 16 is a flow chart showing an example of the processing of controlling the operation of a delay profile calculating section in FIG. 8.

FIG. 16 is a flow chart showing an example of the processing of controlling the operation of the delay profile calculating section 20 in FIG. 15 in the third embodiment of the present invention.

First of all, a delay profile calculation control section 19a checks whether the reception BER is equal to or lower than the first threshold stored in the threshold table 17a (step C-1). This determination is performed upon reception of the first or second reception good signal from the reception data comparing section 18a in FIG. 15. In step C-1, when the first of second reception good signal is input, it is determined that the reception BER is equal to or lower than the first threshold.

If it is determined in step C-1 that the reception BER is not equal to or lower than the reception characteristic threshold, the delay profile calculation control section 19a outputs no delay profile calculation control signal, and the delay profile calculating section 20 normally operates. That is, the delay profile calculating section 20 executes the above delay profile calculation processing (step C-2), and a finger path allocating section 12 executes finger path allocation processing on the basis of the delay profile from the delay profile calculating section 20 (step C-3). The path positions are updated in fingers 13a and 13b of a finger section 13.

If it is determined in step C-1 that the reception BER is equal to or lower than the first threshold, it is checked whether the reception BER is equal to or lower than the second threshold stored in the threshold table 17a. This determination is performed upon reception of the above second reception good signal from the reception data comparing section 18a in FIG. 15. That is, when the second reception good signal is input in step C-5, it is determined that the reception BER is equal to or lower than the second threshold.

If it is determined in step C-5 that the reception BER is equal to or lower than the second threshold, i.e., when the delay profile calculation control section 19a in FIG. 9 receives the first and second good reception signals from the reception data comparing section 18a, the delay profile calculation control section 19a sets the first stop time (step C-6), and outputs a delay profile calculation control signal to the delay profile calculating section 20.

If it is determined in step C-5 that the reception BER is not equal to or lower than the second threshold, i.e., when the delay profile calculation control section 19a in FIG. 15 receives the first reception good signal but does not receive the second reception good signal from the reception data comparing section 18a, the delay profile calculation control section 19a sets the second stop time (step C-7), and outputs a delay profile calculation control signal to the delay profile calculating section 20.

Upon receiving the delay profile calculation control signal, the delay profile calculating section 20 stops the operations of a known signal replica generating section 21, correlation calculating section 22, correlation calculating section 23, signal/power conversion section 24, and averaging section 25 in FIG. 9, and causes a holding section 26 to hold the delay profile input to the averaging section 25 immediately before the delay profile calculation control signal is input and keep outputting the held delay profile (step C-8).

The finger path allocating section 12 in FIG. 15 allocates path positions to the fingers 13a and 13b of the finger section 13 on the basis of the delay profile which is held in the holding section 26 and output therefrom in step C-8 and obtained immediately before the delay profile calculation is stopped (step C-9). That is, in this state, the path position allocation is not changed, and the immediately preceding state is held.

Note that the first stop time set in step C-6 is longer than the second stop time set in step C-7.

In the third embodiment as well, the processing shown in FIG. 11 is performed, and the first and second stop time set in steps C-6 and C-7 are used as the time required for step B-2 in FIG. 11. In the third embodiment, thresholds for reception characteristic are set in steps to determine a delay profile calculation processing stop time in accordance with the current reception characteristics, and the delay profile calculation processing stop time becomes longer as the reception characteristics become better.

The timing of the execution of delay profile calculation processing in the third embodiment will be described below.

Figure 17:
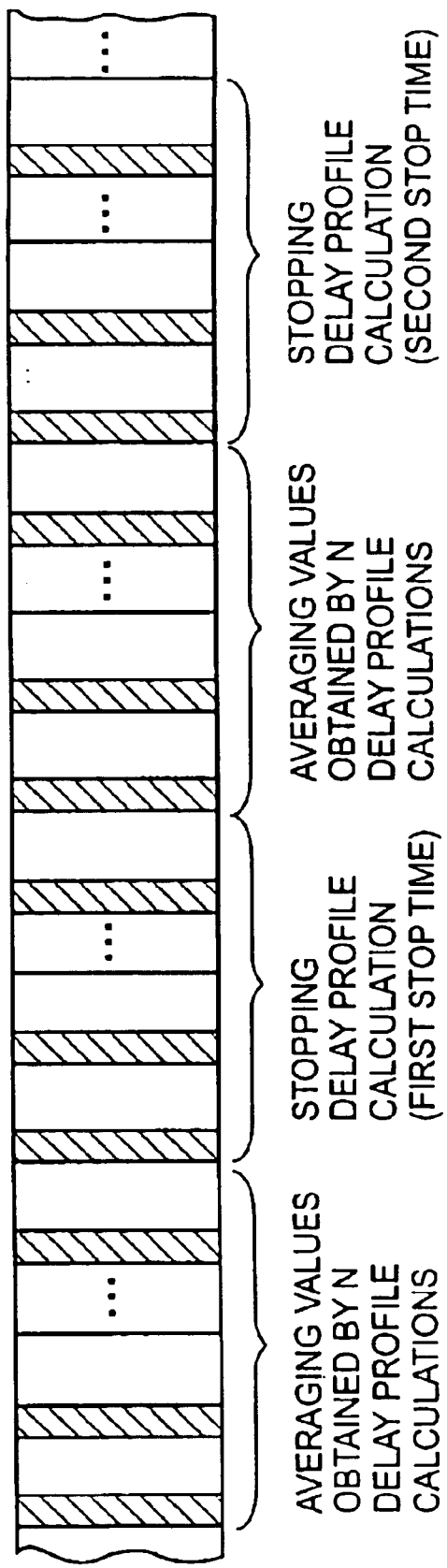
FIG. 17 is a view for explaining an example of the timing of the execution of delay profile calculation processing in the third embodiment of the present invention in FIG. 16.

FIG. 17 is a view for explaining an example of the timing of the execution of delay profile calculation processing in the third embodiment in FIG. 16.

FIG. 17 is a vies showing a reception signal, in which the hatched portions represent pilot symbols in FIG. 6, i.e., known data portions, and the remaining portions represent information data symbol portions.

As shown in FIG. 17, in the demodulation circuit according to the third embodiment, delay profile calculation is performed for each pilot symbol first, and then the values obtained by, for example, N calculations are averaged, thereby obtaining a delay profile to be output from the delay profile calculating section 20 in FIG. 8. If it is determined by the above processing that the reception BER is equal to or lower than the second threshold, the delay profile calculation processing is stopped for the first stop time, and the delay profile calculation processing is resumed after a lapse of the first stop time. If it is determined that the reception BER is equal to or lower than the first threshold but is not equal to or lower than the second threshold, the delay profile calculation processing is stopped for the second stop time, and the delay profile calculation processing is resumed after a lapse of the second stop time.

The fourth embodiment of the present invention will be described next.

Figure 18:
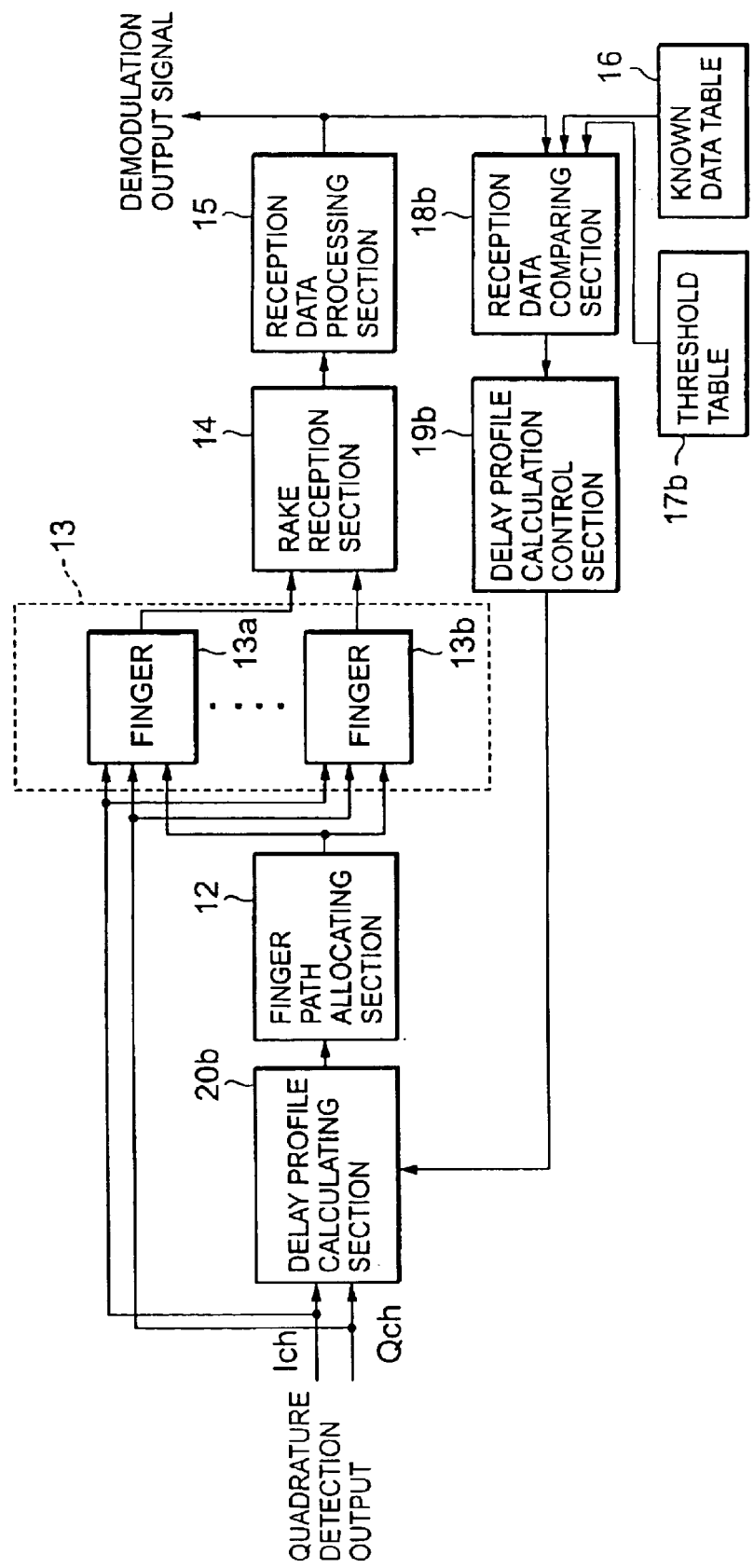
FIG. 18 is a block diagram showing the fourth embodiment of a demodulation circuit which performs demodulation by despreading and serves as a radio communication apparatus according to the present invention in a CDMA mobile station.

FIG. 18 is a block diagram showing the fourth embodiment of a demodulation circuit which performs demodulation by despreading and serves as a radio communication apparatus according to the present invention in a CDMA mobile station.

Figure 19:
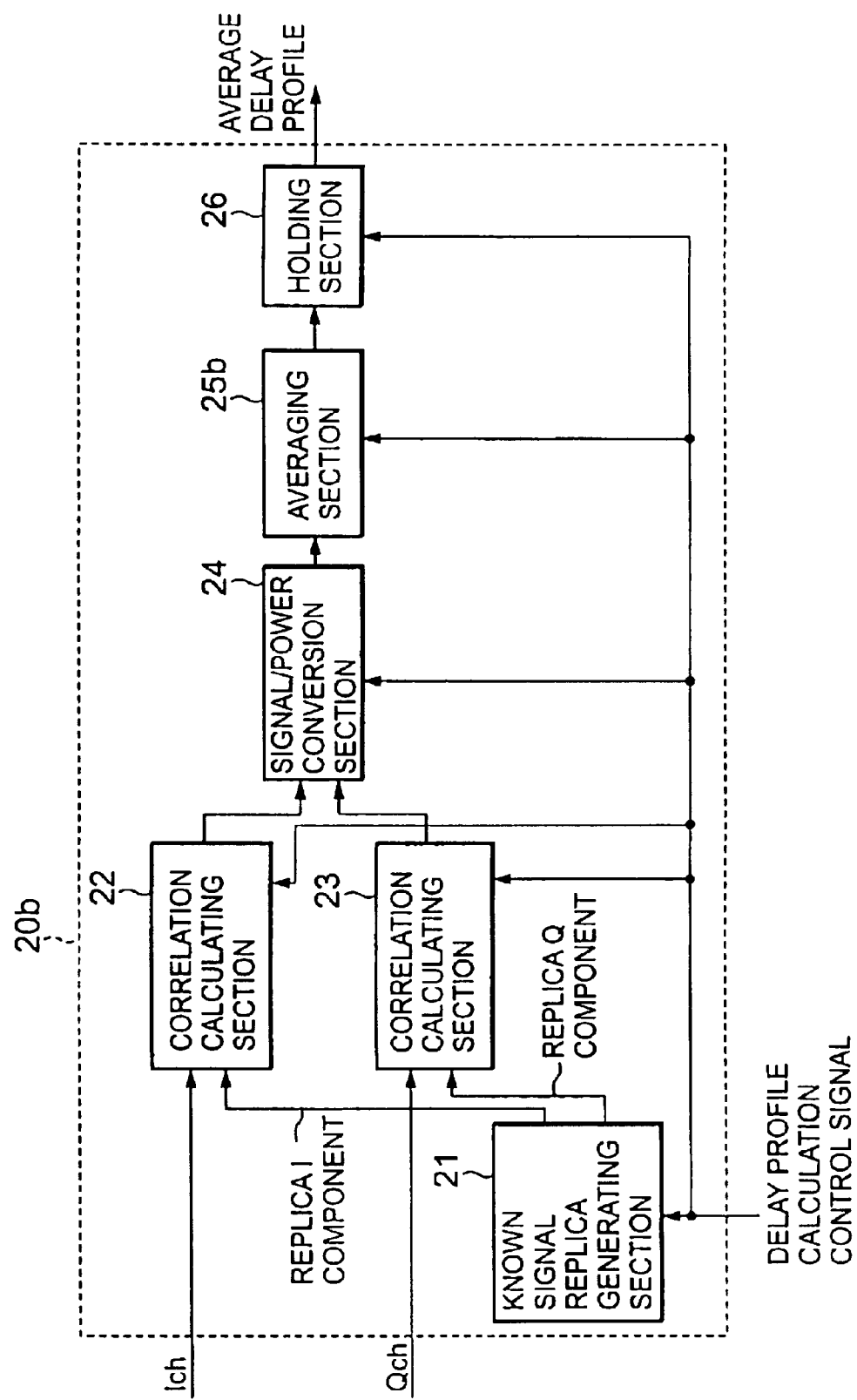
FIG. 19 is a block diagram showing an example of the internal arrangement of a delay profile calculating section in FIG. 18.

FIG. 19 is a block diagram showing an example of the internal arrangement of a delay profile calculating section 20b in FIG. 18.

The same reference numerals as in FIGS. 8 and 9 denote the same parts in FIGS. 18 and 19, and a detailed description thereof will be omitted.

In the first embodiment described above, as shown in FIG. 12, an average delay profile is obtained by averaging the values obtained N calculations, and path positions are allocated to fingers 13a and 13b of a finger section 13 on the basis of the average delay profile. In the fourth embodiment, the number of times of calculations in obtaining an average delay profile can be changed.

In the fourth embodiment, a plurality of thresholds are stored in a threshold table 17b in FIG. 18, and a reception data comparing section 18b and delay profile calculation control section 19b compare a reception BER with a plurality of thresholds to classify the current reception characteristics into a plurality of data, and output the data as a delay profile calculation control signal to a delay profile calculating section 20.

In the delay profile calculating section 20b, which has received this delay profile calculation control signal, the number of times of calculations in obtaining an average delay profile in an averaging section 25b in FIG. 19 is changed in accordance with the current reception characteristics. If, for example, the reception characteristics are good, the number of times of calculations in obtaining an average delay profile may be decreased, and vice versa.

Figure 20:
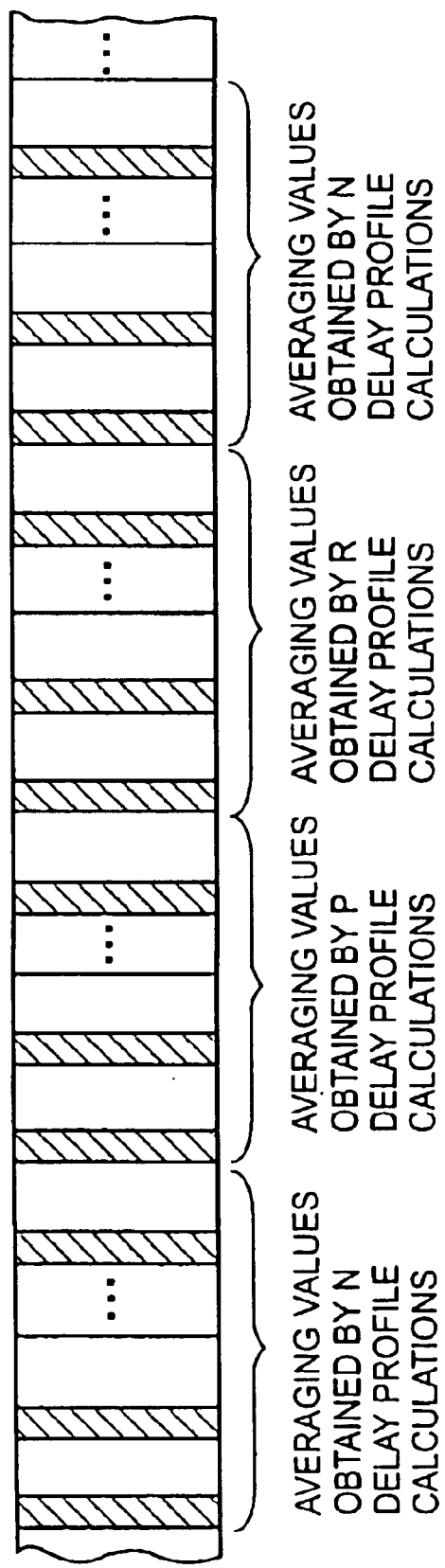
FIG. 20 is a view for explaining an example of the timing of the execution of delay profile calculation processing in the fourth embodiment of the present invention in FIG. 18.

FIG. 20 is a view for explaining an example of the timing of the execution of delay profile calculation processing in the fourth embodiment of the present invention in FIG. 18.

Similar to FIG. 2, FIG. 20 is a view showing a reception signal, in which the hatched portions represent pilot symbols in FIG. 6, i.e., known data portions, and the remaining portions represent information data symbol portions.

As shown in FIG. 20, in the demodulation circuit according to the fourth embodiment, delay profile calculation is performed for each pilot symbol first, and then the values obtained by, for example, N calculations are averaged, thereby obtaining a delay profile to be output from the delay profile calculating section 20b in FIG. 18. If it is determined by the above processing that the reception BER is high, the number of times of calculations in obtaining an average delay profile is changed to P (N>P). If it is determined afterward that the reception BER has increased, the number of times of calculations in obtaining an average delay profile is changed to R (N<R).

By changing the number of times of calculations in obtaining an average delay profile, the ratio of the delay profile calculation stop period shown in FIG. 12 to the total period can be finely adjusted. This makes it possible to further reduce power consumption when the reception characteristics are good.

The fifth embodiment of the present invention will be described next.

Figure 21:
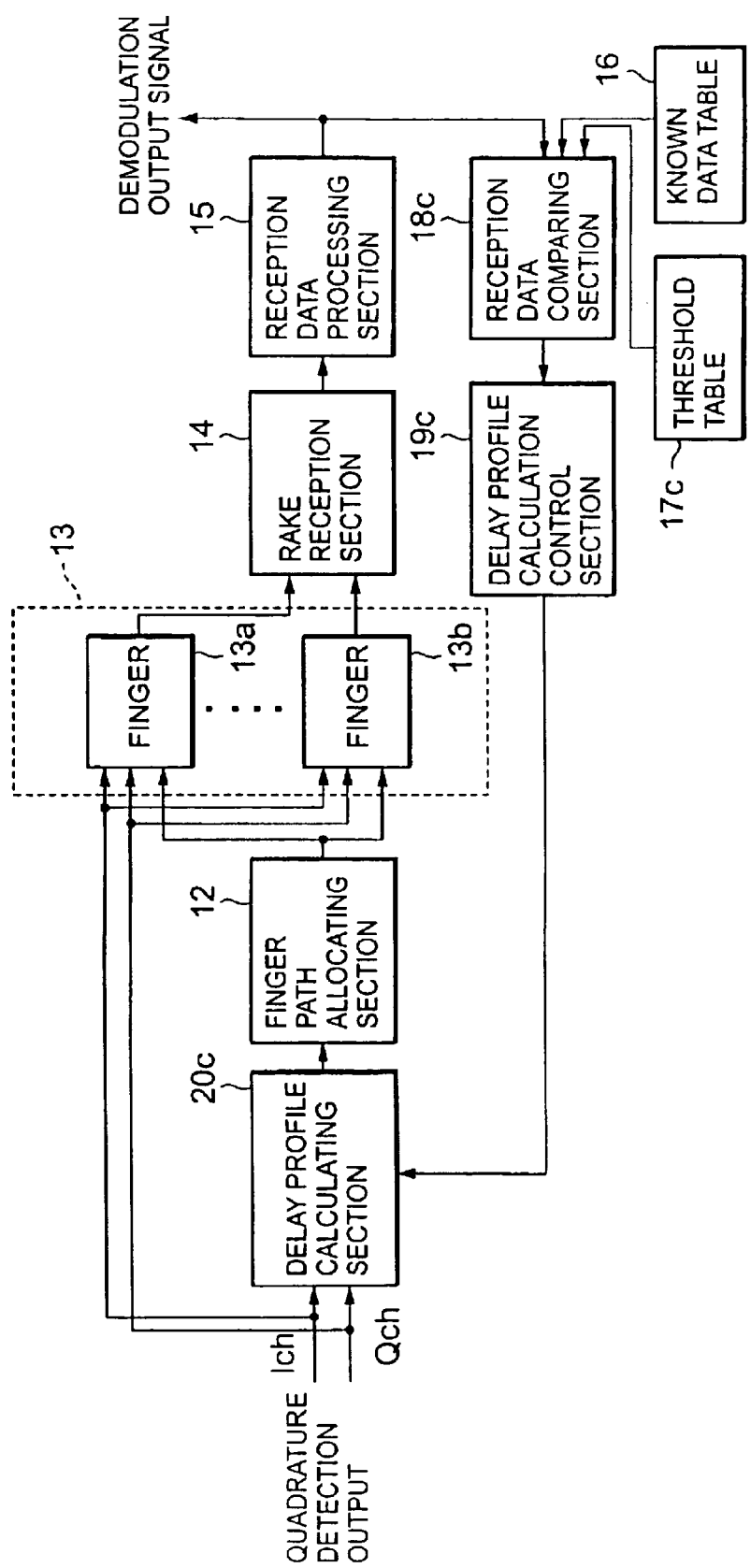
FIG. 21 is a block diagram showing the fifth embodiment of a demodulation circuit which performs demodulation by despreading and serves as a radio communication apparatus according to the present invention in a CDMA mobile station.

FIG. 21 is a block diagram showing the fifth embodiment of a demodulation circuit which performs demodulation by despreading and serves as a radio communication apparatus according to the present invention in a CDMA mobile station.

Figure 22:
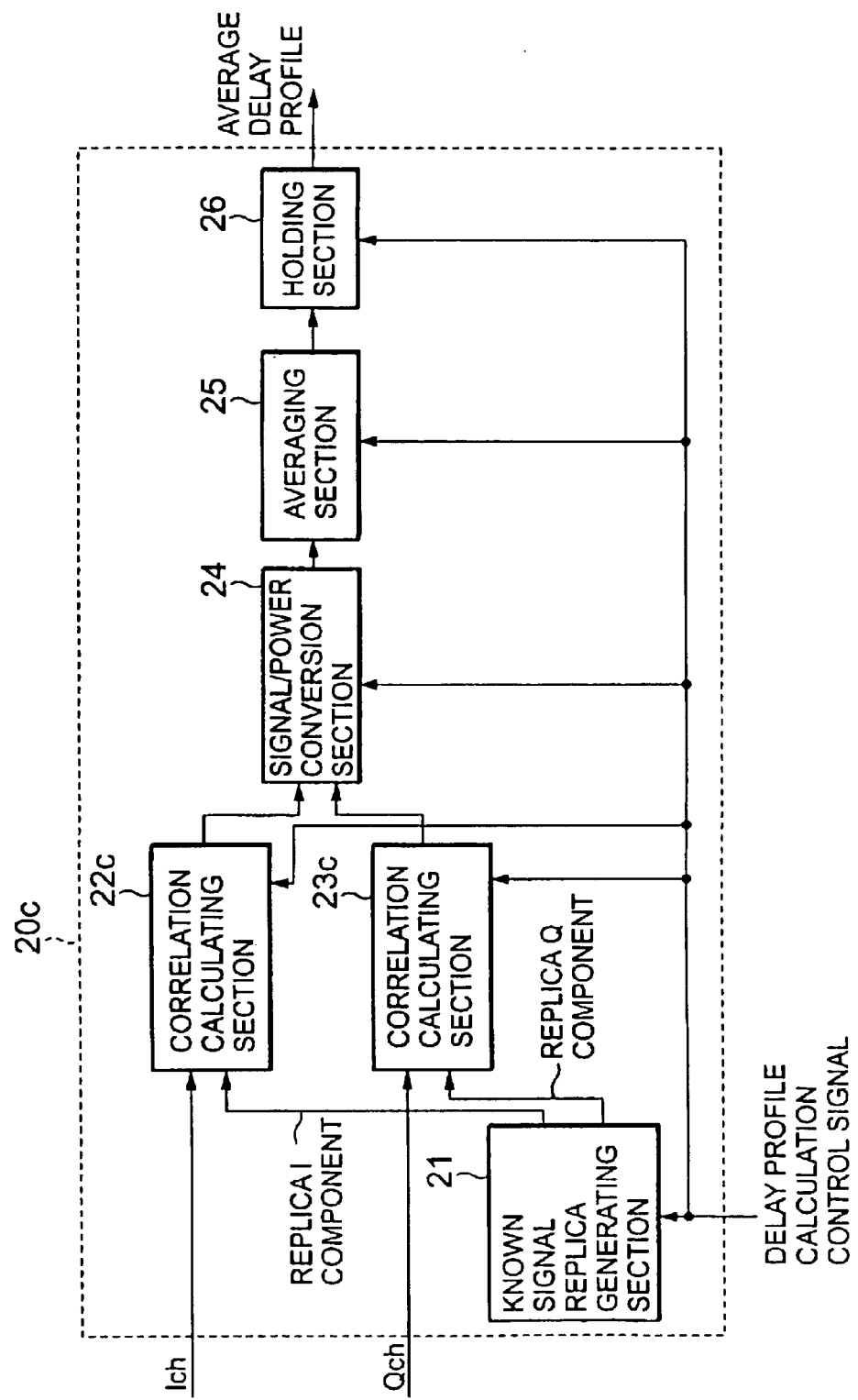
FIG. 22 is a block diagram showing an example of the internal arrangement of a delay profile calculating section in FIG. 21.

FIG. 22 is a block diagram showing an example of the internal arrangement of a delay profile calculating section 20c in FIG. 21.

The same reference numerals as in FIGS. 8 and 9 denote the same parts in FIGS. 21 and 22, and a detailed description thereof will be omitted.

As described with reference to FIG. 6, a pilot symbol is constituted by four symbols. In the other embodiments described above, pilot symbols are used as known data. However, a predetermined number of symbols, one or more, of four symbols can be used as known data.

In the fifth embodiment, the in-phase addition count in the delay profile calculating section 20c is changed in accordance with the current reception characteristics. In this case, the in-phase addition count indicates how many symbols of the pilot symbol pattern constituted by four symbols are used to calculate a delay profile. For example, four in-phase additions indicate calculating a delay profile by using four symbols, and one in-phase addition indicates calculating a delay profile by using one symbol.

In the fifth embodiment, a plurality of thresholds are stored in a threshold table 17c in FIG. 21, and a reception data comparing section 18c and delay profile calculation control section 19c compare a reception BER with a plurality of thresholds to classify the current reception characteristics into a plurality of data, and output the data as a delay profile calculation control signal to the delay profile calculating section 20c.

The delay profile calculating section 20c, which has received this delay profile calculation control signal, stops the operations of correlation sections 22c and 23c in FIG. 22 in accordance with the current reception characteristics (with one in-phase addition, the operation is stopped during a period corresponding to three other symbols). If the reception characteristics are good, the in-phase addition count may be decreased, and vice versa.

Figure 23:
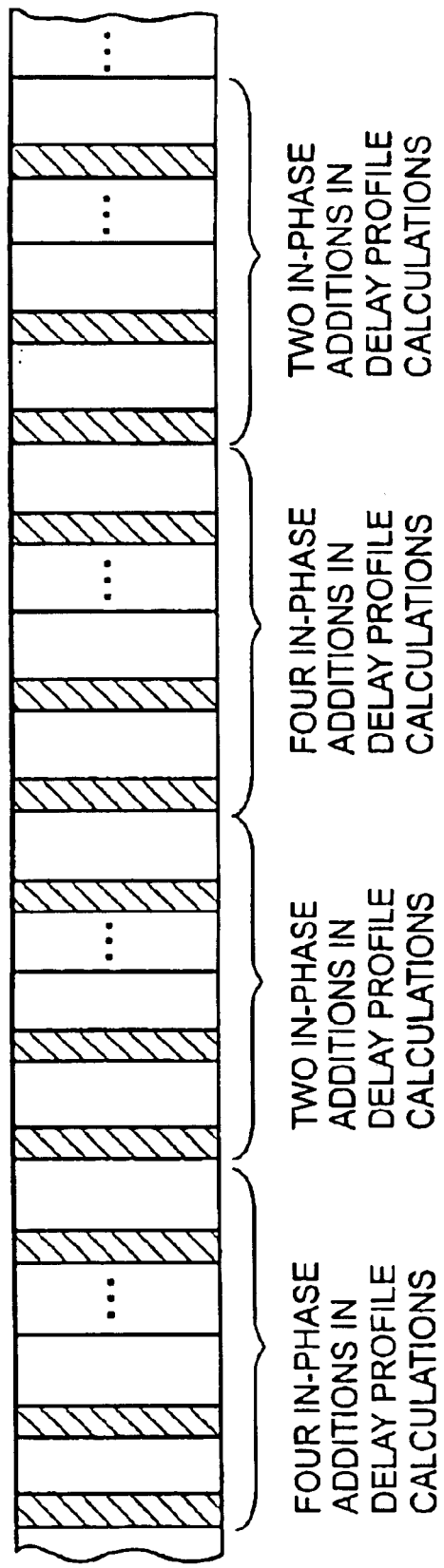
FIG. 23 is a view for explaining an example of the timing of the execution of delay profile calculation processing in the fifth embodiment of the present invention in FIG. 21.

FIG. 23 is a view for explaining an example of the timing of the execution of delay profile calculation processing in the fifth embodiment of the present invention in FIG. 21.

Similar to FIG. 2, FIG. 23 is a view showing a reception signal, in which the hatched portions represent pilot symbols in FIG. 6, i.e., known data portions, and the remaining portions represent information data symbol portions.

As shown in FIG. 23, the demodulation circuit according to the fifth embodiment performs delay profile calculation by four in-phase additions for each pilot symbol to obtain a delay profile to be output from a delay profile calculating section 20b in FIG. 18. If it is determined by the above processing that the reception BER is low, the in-phase addition count in calculating a delay profile is changed to two. If it is determined afterward that the reception BER is high, the in-phase count in calculating a delay profile is changed to four.

Note that if control is performed by combining the above embodiments on the basis of reception characteristics, a reduction in power consumption can be attained while the good reception characteristics are maintained. This point will be described below with reference to the timing chart.

FIG. 24 is a view for explaining an example of the timing of the execution of delay profile calculation processing in a combination of the second and fourth embodiments of the present invention.

Similar to FIG. 2, FIG. 24 is a view showing a reception signal, in which the hatched portions represent pilot symbols in FIG. 6, i.e., known data portions, and the remaining portions represent information data symbol portions.

In the case shown in FIG. 24, delay profile calculation is stopped on the basis of the reception characteristics, and the stop time and the number of times of calculations in obtaining an average delay profile can be changed.

FIG. 25 is a view for explaining an example of the timing of the execution of delay profile calculation processing in a combination of the second, fourth, and fifth embodiments of the present invention.

Similar to FIG. 2, FIG. 25 is a view showing a reception signal, in which the hatched portions represent pilot symbols in FIG. 6, i.e., known data portions, and the remaining portions represent information data symbol portions.

In the case shown in FIG. 25, delay profile calculation is stopped on the basis of the reception characteristics, and the number of times of calculations and/or in-phase addition count in obtaining a delay profile can be changed, together with the stop time.

As has been described above, according to the present invention, when reception characteristics are good, a reduction in power consumption can be attained within a range in which communication can be performed. In contrast to this, if the reception characteristics are poor, optimal path positions can be immediately calculated and allocated to the fingers 13a and 13b of the finger section 13 by performing delay profile calculation more frequently.

What is claimed is:

1. A radio communication apparatus which is used in a CDMA communication system, has a plurality of fingers, and performs rake reception, comprising:

a delay profile calculating section for calculating a delay profile using a reception signal;

a finger path allocating section for allocating path positions to said plurality of fingers on the basis of the delay profile calculated by said delay profile calculating section;

a reception characteristic detecting section for detecting reception characteristics of the reception signal; and a delay profile calculation control section for controlling a delay profile calculation cycle in said delay profile calculating section on the basis of the reception characteristics detected by said reception characteristic detecting section, wherein said delay profile calculation control section stops delay pro-file calculation processing in said delay profile calculating section when the reception characteristics detected by said reception characteristic detecting section are good.

2. An apparatus according to claim 1, wherein the delay profile calculation processing is stopped by interrupting an operation clock supplied to the delay profile calculation processing in said delay profile calculating section.

3. An apparatus according to claim 1, wherein said delay profile calculating section comprises a holding section, and while the delay profile calculation processing is stopped, said holding section keeps outputting a delay profile calculated immediately before the delay profile calculation processing is stopped.

4. An apparatus according to claim 1, wherein said delay profile calculating section calculates an average delay profile by averaging values obtained by performing delay profile calculation by a predetermined number of times, said finger path allocating section allocates path positions to said plurality of fingers on the basis of the average delay profile, and said delay profile calculation control section controls the number of times of calculations in said delay profile calculating section on the basis of the reception characteristics detected by said reception characteristic detecting section.

5. A radio communication apparatus which is used in a CDMA communication system, has a plurality of fingers, and performs rake reception, comprising:

a delay profile calculating section for calculating a delay profile using a reception signal;

a finger path allocating section for allocating path positions to said plurality of fingers on the basis of the delay profile calculated by said delay profile calculating section;

a reception characteristic detecting section for detecting reception characteristics of the reception signal; and a delay profile calculation control section for controlling a delay profile calculation cycle in said delay profile calculating section on the basis of the reception characteristics detected by said reception characteristic detecting section, wherein said delay profile calculation control section stops delay profile calculation processing in said delay profile calculating section for a predetermined period of time in accordance with a predetermined threshold when the reception characteristics detected by said reception characteristic detecting section are good as compared with the predetermined threshold.

6. An apparatus according to claim 5, wherein the delay profile calculation processing is stopped by interrupting an operation clock supplied to the delay profile calculation processing in said delay profile calculating section.

7. An apparatus according to claim 5, wherein said delay profile calculating section comprises a holding section, and while the delay profile calculation processing is stopped, said holding section keeps outputting a delay profile calculated immediately before the delay profile calculation processing is stopped.

8. A radio communication apparatus which is used in a CDMA communication system, has a plurality of fingers, and performs rake reception, comprising:

a delay profile calculating section for calculating a delay profile using a reception signal:

a finger path allocating section for allocating path positions to said plurality of fingers on the basis of the delay profile calculated by said delay profile calculating section;

a reception characteristic detecting section for detecting reception characteristics of the reception signal; and a delay profile calculation control section for controlling an in-phase addition count in delay profile calculation in said delay profile calculating section on the basis of the reception characteristics detected by said reception characteristic detecting section, wherein said delay profile calculation control section decreases an in-phase addition count in said delay profile calculating section when the reception characteristics detected by said reception characteristic detecting section are good.

9. A power consumption control method for a radio communication apparatus which is used in a CDMA communication system, has a plurality of fingers, and performs rake reception, comprising:

the step of receiving a radio signal;

the step of calculating a reception characteristic value of the radio signal;

the step of comparing the reception characteristic value with a predetermined threshold;

the step of stopping delay profile calculation processing when a result of the comparison in the comparison step indicates that the reception characteristic value is larger than the predetermined threshold;

the step of executing the delay profile calculation processing when the result of the comparison in the comparison step indicates that the reception characteristic value is smaller than the predetermined threshold;

the step of allocating path positions to the plurality of fingers on the basis of the delay profile calculated in the execution step; and the step of despreading the radio signal by using said plurality of fingers.

10. A method according to claim 9, further comprising:

the step of detecting whether a predetermined period of time elapses while the delay profile calculation processing is stopped in the stop step; and the step of resuming the delay profile calculation processing when a lapse of the predetermined period of time is detected in the detection step.

11. A power consumption control method for a radio communication apparatus which is used in a CDMA communication system, has a plurality of fingers, and performs rake reception, comprising:

the step of receiving a radio signal;

the step of calculating a reception characteristic value of the radio signal;

the first comparison step of comparing the reception characteristic value with a first predetermined threshold;

the step of executing delay profile calculation processing when a result of the comparison in the first comparison step indicates that the reception characteristic value is smaller than the first predetermined threshold;

the second comparison step of comparing the reception characteristic value with a second predetermined threshold when the result of the comparison in the first comparison step indicates that the reception characteristic value is larger than the first predetermined threshold;

the first stop step of stopping delay profile calculation processing for a first predetermined period of time when a result of comparison in the second comparison step indicates that the reception characteristic value is larger than the second threshold;

the second stop step of stopping delay profile calculation processing for a second predetermined period of time when the result of comparison in the second comparison step indicates that the reception characteristic value is smaller than the second threshold;

the step of allocating path positions to the plurality of fingers on the basis of the delay profile calculated in the execution step; and the step of despreading the radio signal by using said plurality of fingers.

12. A power consumption control method for a radio communication apparatus which is used in a CDMA communication system, has a plurality of fingers, and performs rake reception comprising:

the step of receiving a radio signal;

the step of calculating a reception characteristic value of the radio signal;

the step of comparing the reception characteristic value with a predetermined threshold;

the step of decreasing the number of times of calculations in obtaining an average delay profile when a result of the comparison in the comparison step indicates that the reception characteristic value is larger than the predetermined threshold;

the step of allocating path positions to the plurality of fingers on the basis of the average delay profile; and the step of despreading the radio signal by using said plurality of fingers.

13. A power consumption control method for a radio communication apparatus which is used in a CDMA communication system, has a plurality of fingers, and performs rake reception, comprising:

the step of receiving a radio signal;

the step of calculating a reception characteristic value of the radio signal;

the step of comparing the reception characteristic value with a predetermined threshold;

the step of decreasing an in-phase addition count in. calculating a delay profile when a result of the comparison in the comparison step indicates that the reception characteristic value is larger than the predetermined threshold;

the step of allocating path positions to the plurality of fingers on the basis of the average delay profile; and the step of despreading the radio signal by using said plurality of fingers.

* * * * *